(12) United States Patent
Tie et al.

(10) Patent No.: US 9,461,860 B2
(45) Date of Patent: Oct. 4, 2016

(54) PILOT SIGNAL TRANSMITTING METHOD, AND CHANNEL ESTIMATION METHOD, APPARATUS, AND SYSTEM

(71) Applicant: Huawei Technologies Co., Ltd., Shenzhen, Guangdong (CN)

(72) Inventors: Xiaolei Tie, Shanghai (CN); Xueli Ma, Shanghai (CN); Meng Hua, Shanghai (CN); Shuju Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/536,341

(22) Filed: Nov. 7, 2014

(65) Prior Publication Data

US 2015/0063493 A1     Mar. 5, 2015

Related U.S. Application Data

(63) Continuation of application No. PCT/CN2013/075438, filed on May 10, 2013.

(30) Foreign Application Priority Data

May 10, 2012  (CN) .......................... 2012 1 0144188

(51) Int. Cl.
*H04L 27/26* (2006.01)
*H04B 7/04* (2006.01)
(Continued)

(52) U.S. Cl.
CPC ......... *H04L 27/2626* (2013.01); *H04B 1/0483* (2013.01); *H04B 7/0413* (2013.01);
(Continued)

(58) Field of Classification Search
CPC  H04B 7/0684; H04B 7/0413; H04B 1/0483; H04W 52/325; H04L 5/0048; H04L 5/005; H04L 5/0051; H04L 27/2626; H04L 5/0226; H04L 25/0204
See application file for complete search history.

(56) References Cited

U.S. PATENT DOCUMENTS 8,891,646 B2 * 11/2014 Nammi ................ H04B 7/0619
                                                                370/249
8,989,288 B2 *  3/2015 Liu ..................... H04W 52/325
                                                                370/336
(Continued)

FOREIGN PATENT DOCUMENTS

CN     101310454 A     11/2008
CN     101572682 A     11/2009
(Continued)

OTHER PUBLICATIONS

R1-113431 "Initial discussion on pilot design for 4-branch MIMO", Ericsson, Oct. 10-14, 2011, 3GPP TSG RAN WG1 Meeting#66bis, pp. 1-4.*
(Continued)

*Primary Examiner* — Sophia Vlahos

(57) ABSTRACT

Embodiments of the present invention disclose a pilot signal transmitting method, and a channel estimation method, an apparatus, and a system. The method includes: within a transmission time interval (TTI), transmitting a first pilot signal (CPICH1) on a first antenna, and transmitting a second pilot signal (CPICH2) on a second antenna; when no first-type terminal is scheduled within coverage of a MIMO system within the TTI, transmitting a third pilot signal (CPICH3) on a third antenna, and transmitting a fourth pilot signal (CPICH4) on a fourth antenna; and when a first-type terminal is scheduled within the coverage of the MIMO system within the TTI, transmitting the CPICH3 and a fifth pilot signal (CPICH5) on the third antenna, and transmitting the CPICH4 and a sixth pilot signal (CPICH6) on the fourth antenna. By using the method, interference of a pilot signal to a legacy terminal can be greatly reduced.

12 Claims, 11 Drawing Sheets

(51) Int. Cl.
*H04B 7/06* (2006.01)
*H04L 25/02* (2006.01)
*H04B 1/04* (2006.01)
*H04L 5/00* (2006.01)

(52) U.S. Cl.
CPC .......... *H04B 7/0667* (2013.01); *H04B 7/0684* (2013.01); *H04L 5/0048* (2013.01); *H04L 25/0204* (2013.01); *H04L 25/0226* (2013.01)

(56) References Cited

U.S. PATENT DOCUMENTS

| | | | |
|---|---|---|---|
| 2006/0171342 A1* | 8/2006 | Dateki | H04W 52/286 370/311 |
| 2007/0071127 A1 | 3/2007 | Gore et al. | |
| 2010/0091892 A1 | 4/2010 | Gorokhov | |
| 2010/0260118 A1 | 10/2010 | Taoka et al. | |
| 2011/0026566 A1 | 2/2011 | Grant | |
| 2014/0056374 A1* | 2/2014 | Goransson | H04W 52/343 375/267 |
| 2014/0064400 A1* | 3/2014 | Nammi | H04W 52/325 375/267 |
| 2014/0307718 A1 | 10/2014 | Tie et al. | |

FOREIGN PATENT DOCUMENTS

| | | |
|---|---|---|
| CN | 101809891 A | 8/2010 |
| CN | 102177670 A | 9/2011 |
| CN | 102655486 A | 9/2012 |
| CN | 103220028 A | 7/2013 |
| EP | 2 768 155 A1 | 8/2014 |
| WO | WO 2013/166984 A1 | 11/2013 |

OTHER PUBLICATIONS

R1-112978 "Pilot Design for DL 4-branch MIMO", Huawei, HiSilicon, Oct. 10-14, 2011, 3GPP TSG-RAN Meeting #66bis, pp. 1-6.*

R1-121755 "Four branch MIMO Performance with Common Pilot Gating", Ericsson, Mar. 26-30, 2012, 3GPP TSG-RAN WG1 Meeting #68bis, pp. 1-8.*

R1-120352 "Common Pilot Design for Four branch MIMO System", Ericsson, Feb. 6-10, 2012, 3GPP TSG RAN WG1 Meeting #68, pp. 1-11.*

"Further Considerations and Simulations for Pilot Design", Huawei, HiSilicon, 3GPP TSG RAN WG1 Meeting #68, Feb. 6-10, 2012, 11 pages.

"Pilot design for demodulation for 4-branch MIMO", Huawei, HiSilicon, 3GPP TSG RAN WG1 Meeting #68bis, Mar. 26-30, 2012, 4 pages.

"3rd Generation Partnership Project; Technical Specification Group Radio Access Network; Physical channels and mapping of transport channels onto physical channels (FDD) (Release 11)", 3GPP TS 25.211 V11.0.0, Dec. 2011, 60 pages.

* cited by examiner

PILOT SIGNAL TRANSMITTING METHOD, AND CHANNEL ESTIMATION METHOD, APPARATUS, AND SYSTEM

CROSS-REFERENCE TO RELATED APPLICATIONS

This application is a continuation of International Application No. PCT/CN2013/075438, filed on May 10, 2013, which claims priority to Chinese Patent Application No. 201210144188.8, filed on May 10, 2012, both of which are hereby incorporated by reference in their entireties.

TECHNICAL FIELD

The present invention relates to the communications field, and in particular, to a pilot signal transmitting method, and a channel estimation method, an apparatus, and a system.

BACKGROUND

In a wireless communications technology, a MIMO (Multiple-Input Multiple-Output, multiple-input multiple-output) system supports multiple-input multiple-output transmission from multiple (M) transmit antennas to multiple (N) receive antennas. Certainly, the MIMO system is also compatible with SISO (Single-Input Single-Output, single-input single-output) transmission and the like.

In the MIMO system, channel estimation usually needs to be performed on a radio channel between a base station and a terminal to restore data transmitted through the radio channel. Generally, the base station transmits a pilot signal, and the terminal receives the pilot signal to perform channel estimation. The pilot signal includes a pilot signal sequence that is pre-known by both the base station and the terminal. Therefore, the terminal can perform channel estimation based on the received pilot signal and the pre-known pilot signal sequence.

In the MIMO system, a result of performing channel estimation by using a pilot signal has two functions: One is to perform channel sounding, so that the terminal performs channel state information (Channel State Information, CSI) estimation, including CQI (Channel quality indicator, channel quality indicator) estimation, rank information estimation, PCI (Pre-Coding Indication, pre-coding indication) information estimation, and the like. After completing the CSI estimation, the terminal feeds back CSI information to the base station through an uplink feedback channel. The other is to perform channel estimation for data demodulation.

A four-branch multiple-input multiple-output system 4 Branch MIMO system that is newly introduced into the 3GPP protocol, that is, a 4×4 (4-input 4-output) MIMO system, a 4×2 MIMO system, or a 4×1 MIMO system, is used as an example. Because rank selection, PCI selection, and channel quality estimation for a 4×4 MIMO channel need to be supported and demodulation for a maximum of 4 streams also needs to be supported, a pilot signal needs to be transmitted on all four antennas of a base station, so as to support 4 Branch MIMO terminals (including a 4×4 MIMO terminal, a 4×2 MIMO terminal, and a 4×1 MIMO terminal) to perform channel estimation. Further, the terminal may perform CSI estimation and data demodulation.

Therefore, in the MIMO system (such as a 4 Branch MIMO system or an 8 Branch MIMO system), on a precondition that an existing sending mode of 2×2 MIMO is still in use for a first antenna and a second antenna, how to reduce interference, which is caused by a pilot signal transmitted on a newly added antenna to a legacy terminal (that is, an existing SISO UE and an existing 2 Branch MIMO UE), and ensure necessary receiving performance of a MIMO terminal become an important factor that needs to be considered in pilot signal design of the MIMO system. In addition, in the MIMO system, a downlink code channel resource is very valuable, and therefore, how to reduce consumption of a code channel resource is also a factor that further needs to be considered.

SUMMARY

Embodiments of the present invention provide a pilot signal transmitting method, and a channel estimation method, an apparatus, and a system, which reduces interference to a legacy terminal caused when a pilot signal is transmitted in a MIMO system, and reduces consumption of a code channel resource.

To achieve the foregoing objectives, according to one aspect, an embodiment of the present invention provides a pilot signal transmitting method, where the method is used for transmitting a pilot signal in a multiple-input multiple-output (MIMO) system, and includes:

within a transmission time interval TTI, transmitting a first pilot signal CPICH1 on a first antenna, and transmitting a second pilot signal CPICH2 on a second antenna; and when no first-type terminal is scheduled within coverage of the MIMO system within the TTI, transmitting a third pilot signal CPICH3 on a third antenna, and transmitting a fourth pilot signal CPICH4 on a fourth antenna;

where the CPICH1 is used for channel state information (CSI) estimation and data demodulation, the CPICH2 is used for CSI estimation and data demodulation, the CPICH3 is a pilot signal required for performing CSI estimation, and the CPICH4 is a pilot signal required for performing CSI estimation, the MIMO system includes a 4 Branch MIMO system or an 8 Branch MIMO system, the first-type terminal is a 4 Branch MIMO terminal corresponding to the 4 Branch MIMO system, or a 4 Branch MIMO terminal or an 8 Branch MIMO terminal or both that correspond to the 8 Branch MIMO system.

According to another aspect, an embodiment of the present invention further provides a channel estimation method, where the method is used for acquiring a pilot signal by a first-type terminal in a multiple-input multiple-output MIMO system to perform channel estimation, and includes:

within a TTI, detecting, by a terminal UE, whether the terminal itself is scheduled;

when it is detected that the terminal itself is not scheduled, within the TTI, acquiring a CPICH1, a CPICH2, a CPICH3, and a CPICH4 to perform channel estimation.

According to another aspect, an embodiment of the present invention further provides a channel estimation method, where the method is used for acquiring a pilot signal by a first-type terminal in a multiple-input multiple-output MIMO system to perform channel estimation, and includes:

within a TTI, detecting, by a terminal, whether the terminal itself is scheduled;

if it is detected that the terminal itself is not scheduled, further detecting whether another first-type terminal is scheduled within the TTI;

if another first-type terminal is scheduled, within the TTI, acquiring a CPICH1, a CPICH2, a CPICH3, a CPICH4, a CPICH5, and a CPICH6 to perform channel estimation; and if no other first-type terminal is scheduled, within the TTI, acquiring the CPICH1, the CPICH2, the CPICH3, and the CPICH4 to perform channel estimation.

According to another aspect, an embodiment of the present invention further provides a communications base station, where the base station includes: a first antenna, a second antenna, a third antenna, a fourth antenna, and a pilot signal transmitting apparatus, where:

the pilot signal transmitting apparatus includes:

a first transmitting unit, configured to: within a transmission time interval TTI, transmit a first pilot signal CPICH1 on the first antenna, and transmit a second pilot signal CPICH2 on the second antenna; and a second transmitting unit, configured to: when no first-type terminal is scheduled within coverage of a MIMO system within the TTI, transmit a third pilot signal CPICH3 on the third antenna, and transmit a fourth pilot signal CPICH4 on the fourth antenna;

where the CPICH1 is used for channel state information CSI estimation and data demodulation, the CPICH2 is used for CSI estimation and data demodulation, the CPICH3 is used for CSI estimation, and the CPICH4 is used for CSI estimation.

According to another aspect, an embodiment of the present invention further provides a terminal, where the terminal includes:

a detecting module, configured to detect whether the terminal itself is scheduled within a TTI; and a channel estimation module, configured to: when it is detected that the terminal itself is not scheduled, within the TTI, acquire a CPICH1, a CPICH2, a CPICH3, and a CPICH4 to perform channel estimation;

where the CPICH1 and the CPICH2 are a first pilot signal and a second pilot signal that are transmitted, on a base station side, respectively on a first antenna and a second antenna and are required for performing CSI estimation and channel estimation that is used for data demodulation, the CPICH3 and the CPICH4 are a third pilot signal and a fourth pilot signal that are transmitted, on the base station side, respectively on a third antenna and a fourth antenna and are required for performing CSI estimation, and the terminal is a 4 Branch MIMO terminal corresponding to a 4 Branch MIMO system, or a 4 Branch MIMO terminal or an 8 Branch MIMO terminal or both that correspond to an 8 Branch MIMO system.

According to another aspect, an embodiment of the present invention further provides a terminal, where the terminal includes:

a first detecting module, configured to detect whether the terminal itself is scheduled within a TTI; and a second detecting module, configured to: when the first detecting module detects that the terminal itself is not scheduled, further detect whether another first-type terminal is scheduled within the TTI; and a channel estimation module, configured to: when the second detecting module detects that another first-type terminal is scheduled within the TTI, within the TTI, acquire a CPICH1, a CPICH2, a CPICH3, a CPICH4, a CPICH5, and a CPICH6 to perform channel estimation; or configured to: when the second detecting module detects that no other first-type terminal is scheduled within the TTI, within the TTI, acquire a CPICH1, a CPICH2, a CPICH3, and a CPICH4 to perform channel estimation.

According to another aspect, an embodiment of the present invention further provides a MIMO system, including a base station and multiple terminals, where the base station includes the foregoing base station, and the multiple terminals include at least the foregoing terminal.

In the embodiments of the present invention, with a method for determining transmitting of a pilot signal based on whether a first-type terminal is scheduled, interference to a legacy terminal caused when a pilot signal is transmitted in a MIMO system is reduced; and further, by using a code channel allocation solution provided in the present invention to transmit a pilot signal, consumption of a code channel resource is reduced.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely apart rather than all of the embodiments of the present invention. All other embodiments obtained by a person of ordinary skill in the art based on the embodiments of the present invention without creative efforts shall fall within the protection scope of the present invention.

A pilot signal transmitting method according to the embodiments of the present invention may be applied to, including but not limited to, a 4 Branch MIMO system, which specifically includes a 4×4 (4-input 4-output) MIMO system, a 4×2 (4-input 2-output) MIMO system, and a 4×1 MIMO (4-input 1-output) system, and an 8 Branch MIMO system, which specifically includes an 8×8 (8-input 8-output) MIMO system, an 8×4 (8-input 4-output) MIMO system, an 8×2 (8-input 2-output) MIMO system, and the like. By transmitting a corresponding pilot signal on a base station, interference to a legacy terminal is reduced on a premise of ensuring that channel estimation is well performed by all terminals within coverage of the base station.

Embodiment 1

Figure 1:
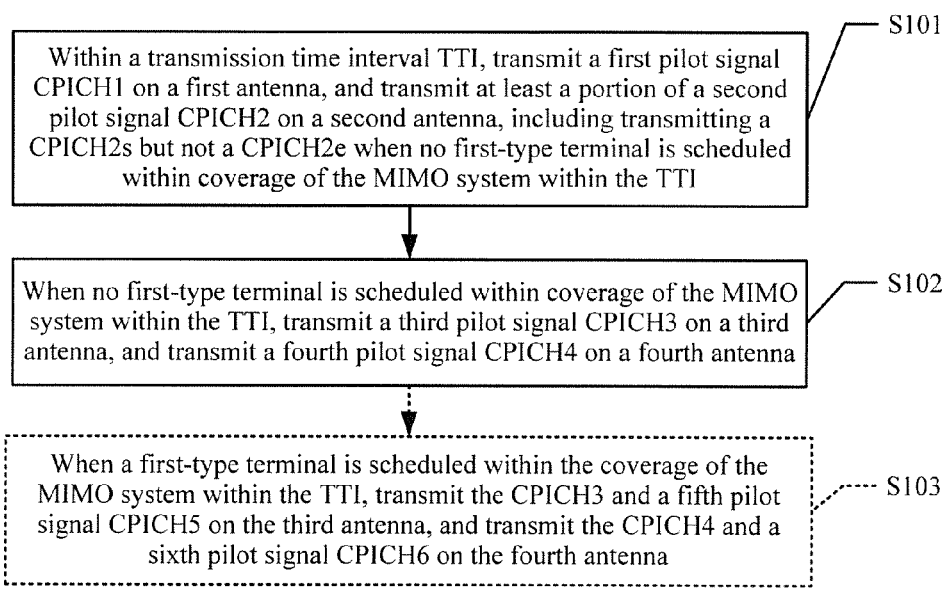
FIG. 1 is a schematic flowchart of a pilot signal transmitting method according to Embodiment 1 of the present invention.

FIG. 1 is a schematic flowchart of Embodiment 1 of a pilot signal transmitting method according to the present invention.

Specifically, the method in this embodiment includes:

S101: Within a transmission time interval TTI, transmit a first pilot signal CPICH1 on a first antenna, and transmit a second pilot signal CPICH2 on a second antenna.

The CPICH1 is used for channel state information CSI estimation and data demodulation, and the CPICH2 is used for CSI estimation and data demodulation.

In the prior art of a UMTS, specifically, in a downlink 2×2 MIMO sending mode, two code channels need to be occupied by the CPICH1 and the CPICH2 so as to send the CPICH1 and the CPICH2 to downlink. A more specific example is as follows: The CPICH1 is sent through a first code channel and the CPICH2 is sent through a second code channel. To support the downlink 2×2 MIMO sending mode, a base station may transmit, within all TTIs by using an antenna, a pilot signal that is not only used for channel sounding (channel sounding) such as channel state information (Channel State Information, CSI) estimation by a terminal but is also used for channel estimation Channel Estimation required for data demodulation, where the channel state information estimation includes CQI (Channel quality indicator, channel quality indicator) estimation, rank information estimation, and PCI (Pre-Coding Indication, pre-coding indication) information estimation, and the like. When a pilot signal is to be transmitted, based on a requirement of cell coverage, a relatively large transmit power $P_{Pilot,i}=P_{SPilot,i}+P_{EPilot,i}$ is used for transmitting the pilot signal, where $P_{SPilot,i}$ indicates a pilot transmit power required for channel sounding Channel Sounding (that is, CSI estimation); $P_{EPilot,i}$ indicates a pilot transmit power required for data demodulation Demodulation, or indicates a pilot transmit power that needs to be added for data demodulation in addition to $P_{SPilot,i}$; and the subscript i indicates a serial number of an antenna, that is, an $i^{th}$ antenna. For ease of differentiation and description, reference is made to the description herein for subsequent definitions of $P_{Pilot,i}$, $P_{SPilot,i}$, and $P_{EPilot,i}$, and the definitions are not repeated. However, in these definitions, a different subscript value of i is used to indicate a transmit power corresponding to an antenna with a different serial number It should be noted that, in another embodiment of the present invention, when the second pilot signal is transmitted on the second antenna in step S101, if no 2×1 MIMO terminal or 2×2 MIMO terminal is scheduled in the MIMO system, the second pilot signal CPICH2 may further be decomposed into two pilot signals: a CPICH2s and a CPICH2e. When no first-type terminal is scheduled in a current TTI, the pilot signal CPICH2s is transmitted within only a corresponding TTI; and only when a first-type terminal is scheduled in the current TTI, the CPICH2e is also transmitted within the corresponding TTI. The CPICH2s is a pilot signal required for performing CSI estimation, and all first-type terminals within coverage of the base station can perform channel state information CSI estimation according to the CPICH2s. The CPICH2e is a pilot signal required for performing data demodulation, and all the first-type terminals within the coverage can perform, according to the CPICH2e, channel estimation required for data demodulation. In this way, interference to a legacy terminal can be reduced.

Further, in another embodiment of the present invention, in step S101, when no legacy terminal exists in the MIMO system, the CPICH1 and the CPICH2 each are decomposed into two pilot signals: CPICH1s and CPICH1e, and CPICH2s and CPICH2e. The CPICH1s and the CPICH2s are pilot signals transmitted at powers that are required by all first-type terminals within coverage for performing channel state information CSI estimation. The CPICH1e and the CPICH2e are pilot signals that are sent according to additional pilot transmit powers required for ensuring all the first-type terminals within the coverage to perform channel estimation for data demodulation, and are pilot signals that are sent within a current corresponding TTI only when a first-type terminal is scheduled within the current TTI.

It should be further noted that, in a 4 Branch MIMO or an 8 Branch MIMO system, a corresponding base station may include four antennas (4 Branch MIMO) or eight antennas (8 Branch MIMO) respectively, and another MIMO system is inferred in the same way. In these MIMO systems, a sending mode supporting downlink SISO and 2×2 MIMO is usually used to be compatible with a legacy terminal. In step S101, within all TTIs, the base station may transmit the first pilot signal CPICH1 at a transmit power $P_{Pilot,1}=P_{SPilot,1}+P_{EPilot,1}$ on the first antenna and transmit the second pilot signal CPICH2 at a transmit power $P_{Pilot,2}=P_{SPilot,2}+P_{EPilot,2}$ on the second antenna. $P_{Pilot,1}$ indicates a power required for transmitting, on the first antenna, a pilot signal that enables all first-type terminals within coverage to perform both channel state information CSI estimation and channel estimation that is used for data demodulation. $P_{Pilot,2}$ indicates a power required for transmitting, on the second antenna, a pilot signal that enables all the first-type terminals within the coverage to perform both channel state information CSI estimation and channel estimation that is used for data demodulation. The first pilot signal CPICH1 and the second pilot signal CPICH2 can enable a legacy terminal to perform channel estimation, and can also be used by another MIMO terminal (such as a 4 Branch MIMO terminal or an 8 Branch MIMO terminal) to perform channel estimation. In a downlink 2×2 MIMO sending mode, each of the CPICH1 and the CPICH2 needs to occupy one code channel resource for sending.

S102: When no first-type terminal is scheduled within coverage of a MIMO system within the TTI, transmit a third pilot signal CPICH3 on a third antenna, and transmit a fourth pilot signal CPICH4 on a fourth antenna.

The CPICH3 is a pilot signal required for performing CSI estimation, the CPICH4 is a pilot signal required for performing CSI estimation, the MIMO system includes a 4 Branch MIMO system or an 8 Branch MIMO system, and the first-type terminal is a 4 Branch MIMO terminal corresponding to the 4 Branch MIMO system, or a 4 Branch MIMO terminal or an 8 Branch MIMO terminal or both that correspond to the 8 Branch MIMO system.

In step S102, the base station continuously transmits the CPICH3 and the CPICH4 respectively on the third antenna and the fourth antenna at relatively low transmit powers $S_{SPilot,3}$ and $P_{SPilot,4}$, where $P_{SPilot,3}$ indicates a transmit power required for transmitting the CPICH3, and $P_{SPilot,4}$ indicates a transmit power required for transmitting the CPICH4.

In step S102, specifically, when the pilot signals are sent, the CPICH3 and the CPICH4 may be sent through two code channels, for example, the CPICH3 is sent through a third code channel, and the CPICH4 is sent through a fourth code channel; or the CPICH3 and the CPICH4 may be sent through one code channel (that is, sent in an STTD mode) according to two orthogonal space-time block coding based transmit diversity (Space Time Transmit Diversity, STTD) pilot patterns, that is, STTD patterns, for example, the CPICH3 may be converted into a CPICH3_PatternA, the CPICH4 may be converted into a CPICH3_PatternB, the CPICH3_PatternA and the CPICH3_PatternB are a pair of mutually orthogonal pilot patterns, and the CPICH3_PatternA and the CPICH3_PatternB are sent through a third code channel.

In this embodiment of the present invention, a non-MIMO SISO terminal, such as a single-input single-output terminal or a single-input 2-output terminal, a 2 Branch MIMO terminal, such as a 2×1 MIMO terminal (a 2-input single-output terminal) or a 2×2 MIMO terminal (a 2-input 2-output terminal), and the like are defined as legacy terminals Legacy UEs. In this embodiment, when the pilot signals are transmitted on the third antenna and the fourth antenna in the MIMO system, because the CPICH3 and the CPICH4 are transmitted at relatively low powers $P_{SPilot,3}$ and $P_{SPilot,4}$, interference caused to a legacy terminal Legacy UE is reduced, and impact on performance of the Legacy UE caused by an antenna newly added for transmitting a pilot signal is further reduced.

S103: When a first-type terminal is scheduled within the coverage of the MIMO system within the TTI, transmit the CPICH3 and a fifth pilot signal CPICH5 on the third antenna, and transmit the CPICH4 and a sixth pilot signal CPICH6 on the fourth antenna, where the CPICH3 is the pilot signal required for performing CSI estimation, the CPICH4 is the pilot signal required for performing CSI estimation, the CPICH5 is a pilot signal required for performing data demodulation, and the CPICH6 is a pilot signal required for performing data demodulation.

It should be noted that, in this embodiment, the CPICH3 is mainly used for CSI estimation, the CPICH5 is mainly used for data demodulation, or the CPICH3 and the CPICH5 may be combined and used for data demodulation. Similarly, the CPICH4 is mainly used for CSI estimation, the CPICH6 is mainly used for data demodulation, or the CPICH4 and the CPICH6 may be combined and used for data demodulation. Therefore, when the first-type terminal performs data demodulation according to the CPICH5, the CPICH5 may be separately used for data demodulation, or the CPICH3 and the CPICH5 may be combined to perform data demodulation. Similarly, when the first-type terminal performs data demodulation according to the CPICH6, the CPICH6 may be separately used for data demodulation, or the CPICH4 and the CPICH6 may be combined to perform data demodulation.

In step S103, when it is determined that a first-type terminal is scheduled within the coverage of the MIMO system and the MIMO system transmits the pilot signals on the third antenna and the fourth antenna, compared with step S102, the transmit powers $P_{EPilot,3}$ and $P_{EPilot,4}$ are added respectively, and the CPICH5 and the CPICH6 are also transmitted respectively on the third antenna and the fourth antenna, where $P_{EPilot,3}$ indicates a transmit power required for adding the CPICH5 for transmitting on the third antenna, and $P_{EPilot,4}$ indicates a transmit power required for adding the CPICH6 for transmitting on the fourth antenna.

In this embodiment of the present invention, whether to transmit a pilot signal, which is used for data demodulation, on an antenna other than the first antenna and the second antenna is determined by determining whether a first-type terminal within the coverage of the base station is scheduled within the current TTI in step S102 and step S103. Only when it is determined that a first-type terminal is scheduled in the MIMO system within the current TTI, on the third antenna, the CPICH3 is transmitted by using the transmit power $P_{SPilot,3}$ that supports CSI estimation, and the CPICH5 is transmitted by using the $P_{EPilot,3}$ required for supporting data demodulation, or by using the transmit power $P_{EPilot,3}$ needing to be added in addition to $P_{SPilot,3}$ for supporting data demodulation; and on the fourth antenna, the CPICH4 is transmitted by using the transmit power $P_{SPilot,4}$ that supports CSI estimation, and the CPICH6 is transmitted by using the $P_{EPilot,4}$ required for supporting data demodulation, or by using the transmit power $P_{EPilot,4}$ needing to be added in addition to the $P_{SPilot,4}$ for supporting data demodulation, so as to ensure that the first-type terminal in the coverage of the base station can perform operations such as CSI estimation and channel estimation that is used for data demodulation. Otherwise, pilot signal transmitting is performed on the third antenna and the fourth antenna according to step S102. In the solution that is provided in the present invention and in which pilot signal transmitting is performed based on whether a first-type terminal is scheduled, waste of a transmit power and interference to a Legacy UE are reduced.

Figure 2:
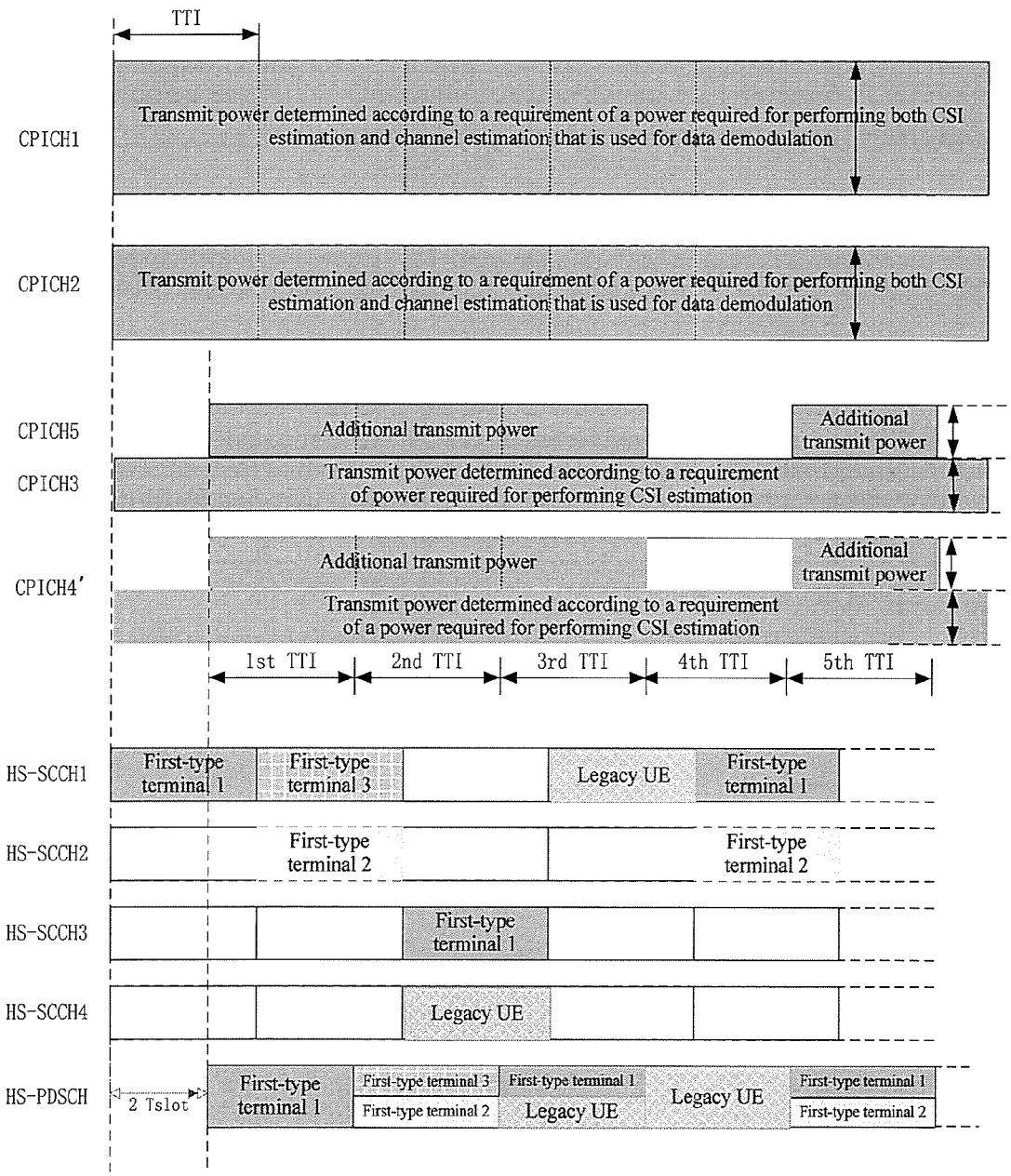
FIG. 2 is a schematic diagram of pilot signal sending and a time sequence on each antenna according to Embodiment 1 of the present invention.

Further, as shown in FIG. 2, in step S103 of an embodiment of this method, the CPICH3 and the CPICH5 that are transmitted on the third antenna may be sent through two different code channels, and the CPICH4 and the CPICH6 that are transmitted on the fourth antenna may be combined into one pilot signal CPICH4' and the CPICH4' may be sent through another code channel. A specific example is as follows: the CPICH3 and the CPICH5 may be transmitted respectively at the transmit powers $S_{Pilot,3}$ and $P_{EPilot,3}$ on the third antenna and sent through two different code channels: a third code channel and a fourth code channel; and the CPICH4 and the CPICH6 that are transmitted on the fourth antenna are combined into one pilot signal CPICH4', and the CPICH4' is transmitted at a power $P_{SPilot,4}+P_{EPilot,4}$ through a fifth code channel.

Figure 3:
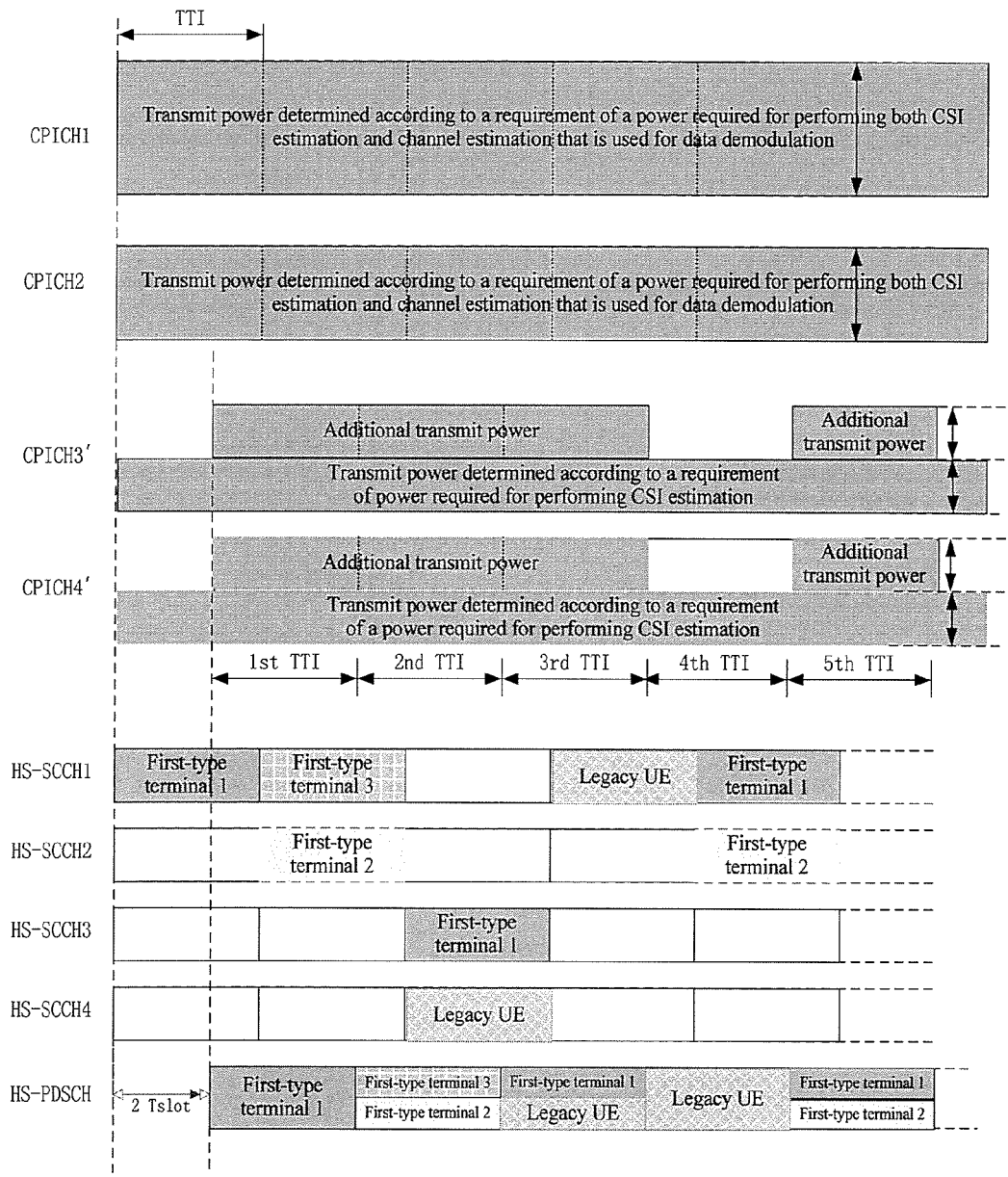
FIG. 3 is another schematic diagram of pilot signal sending and a time sequence on each antenna according to Embodiment 1 of the present invention.

As shown in FIG. 3, in step S103 in another embodiment of this method, the CPICH3 and the CPICH5 that are transmitted on the third antenna may be combined into one pilot signal CPICH3' and the CPICH3' is sent through one code channel; and the CPICH4 and the CPICH6 that are transmitted on the fourth antenna may be combined into another pilot signal CPICH4' and the CPICH4' is sent through another code channel. Specifically, the CPICH3 and the CPICH5 that are transmitted on the third antenna may be combined into the CPICH3' and the CPICH3' is transmitted at a transmit power $P_{SPilot,3}+P_{EPilot,3}$ through a third code channel; and the CPICH4 and the CPICH6 that are transmitted on the fourth antenna may be combined into the CPICH4' and the CPICH4' is transmitted at a transmit power $P_{SPilot,4}+P_{EPilot,4}$ through a fourth code channel.

Figure 4:
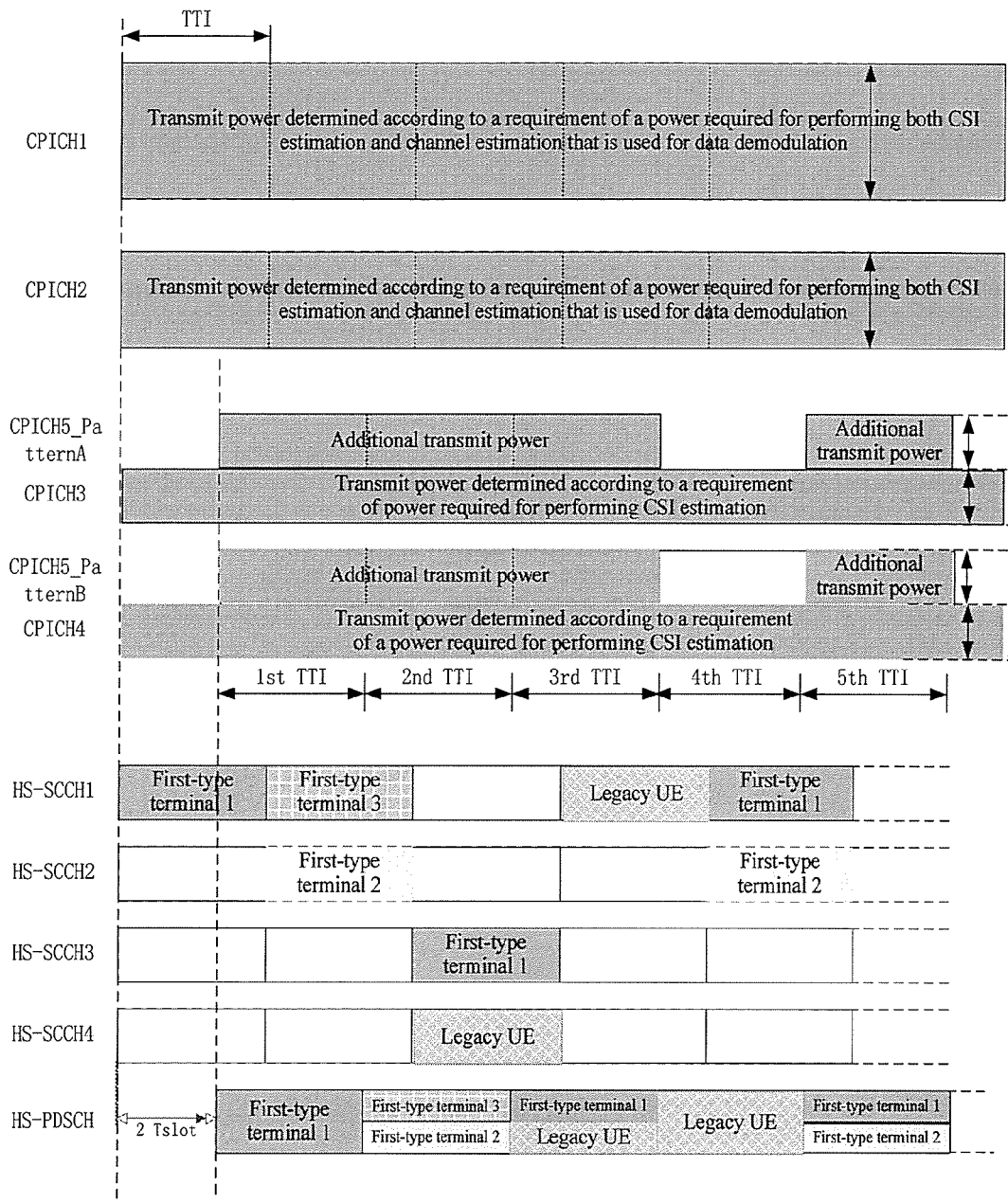
FIG. 4 is still another schematic diagram of pilot signal sending and a time sequence on each antenna according to Embodiment 1 of the present invention.

As shown in FIG. 4, in step S103 in still another embodiment of this method, the CPICH3 that is transmitted on the third antenna and the CPICH4 that is transmitted on the fourth antenna may be sent through two code channels; and the CPICH5 that is transmitted on the third antenna and the CPICH6 that is transmitted on the fourth antenna may be sent through another code channel according to two orthogonal space-time block coding based transmit diversity pilot patterns STTD patterns. A specific example is as follows: the CPICH3 may be sent through a third code channel, the CPICH4 may be sent through a fourth code channel, and the transmit powers of the CPICH3 and the CPICH4 are $P_{SPilot,3}$ and $P_{SPilot,4}$ respectively; the CPICH5 is converted into a CPICH5_PatternA and the CPICH6 is converted into a CPICH5_PatternB respectively, the CPICH5_PatternA and the CPICH5_PatternB are sent through a fifth code channel, the CPICH5_PatternA and the CPICH5_PatternB are a pair of mutually orthogonal pilot patterns, the CPICH5_PatternA is transmitted on the third antenna and the CPICH5_PatternB is transmitted on the fourth antenna respectively, and transmit powers are $P_{EPilot,3}$ and $P_{EPilot,4}$ respectively.

Figure 5:
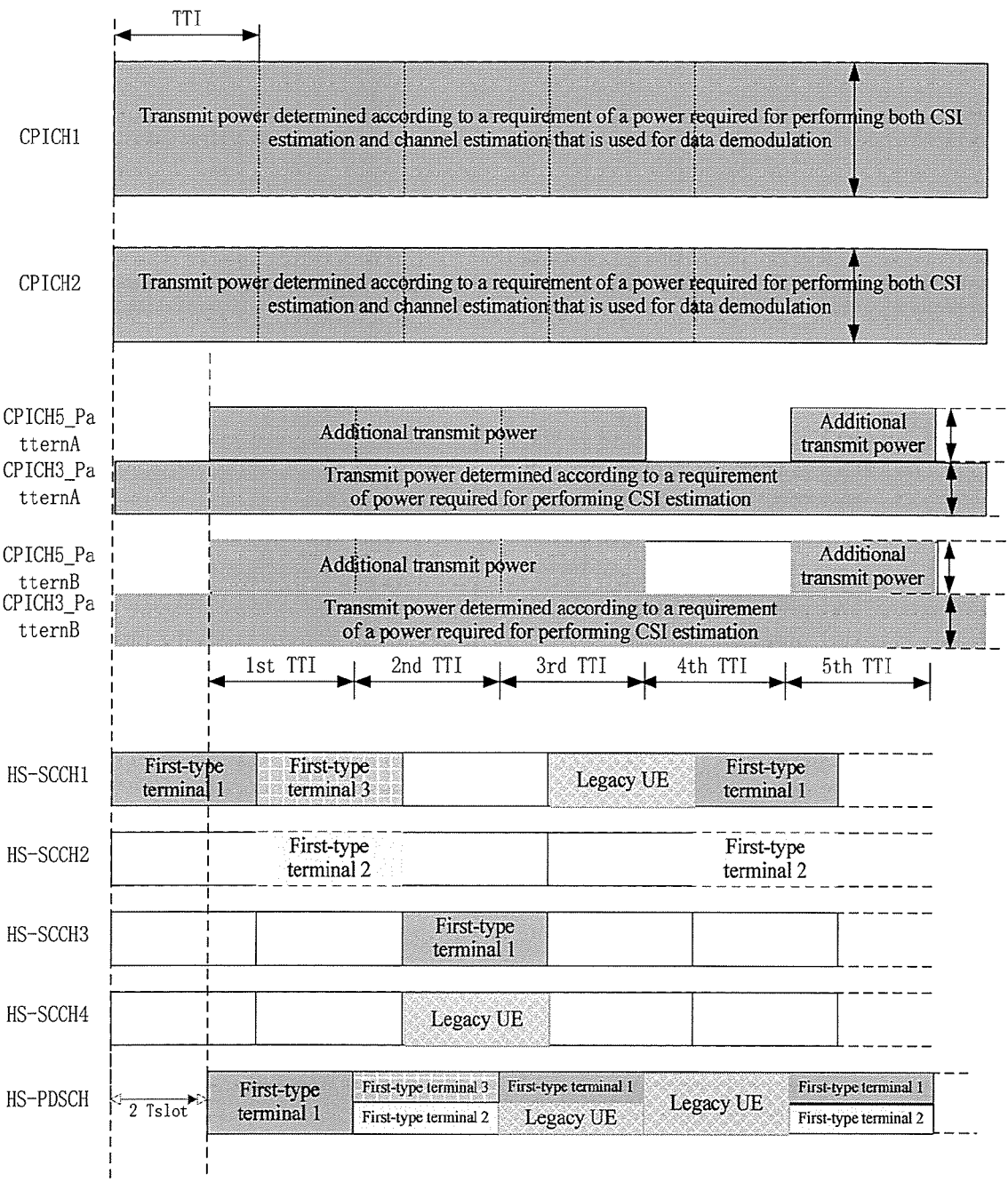
FIG. 5 is yet another schematic diagram of pilot signal sending and a time sequence on each antenna according to Embodiment 1 of the present invention.

As shown in FIG. 5, in step S103 in yet another embodiment of this method, the CPICH3 that is transmitted on the third antenna and the CPICH4 that is transmitted on the fourth antenna may be sent through one code channel according to two orthogonal STTD patterns; and the CPICH5 that is transmitted on the third antenna and the CPICH6 that is transmitted on the fourth antenna may be sent through another code channel according to another two orthogonal STTD patterns. A specific example is as follows: the CPICH3 may be converted into a CPICH3_PatternA and the CPICH4 may be converted into a CPICH3_PatternB, the CPICH3_PatternA and the CPICH3_PatternB are sent through a third code channel, the CPICH3_PatternA and the CPICH3_PatternB are a pair of mutually orthogonal pilot patterns, the CPICH3_PatternA is transmitted on the third antenna and the CPICH3_PatternB is transmitted on the fourth antenna respectively, and transmit powers are $P_{SPilot,3}$ and $P_{SPilot,4}$ respectively. In addition, the CPICH5 is converted into a CPICH5_PatternA and the CPICH6 is converted into a CPICH5_PatternB, the CPICH5_PatternA and the CPICH5_PatternB are sent through a fourth code channel, the CPICH5_PatternA and the CPICH5_PatternB are another pair of mutually orthogonal pilot patterns, the CPICH5_PatternA is transmitted on the third antenna and the CPICH5_PatternB is transmitted on the fourth antenna respectively, and transmit powers are $P_{EPilot,3}$ and $P_{EPilot,4}$ respectively. A person skilled in the prior art should understand that the two orthogonal STTD patterns corresponding to the CPICH3 and the CPICH5 and the another two orthogonal STTD patterns corresponding to the CPICH4 and the CPICH6 may be encoded according to a same format.

In step S103, in the pilot signal transmitting method by using a code channel allocation solution provided in this embodiment, consumption of a code channel resource can be effectively reduced in comparison with a case in which the CPICH3, the CPICH4, the CPICH5, and the CPICH6 each need to occupy one code channel resource for sending.

It should be noted that, for a pilot pattern STTD Pattern mentioned in this embodiment, reference may be made to an orthogonal pattern in a CPICH STTD solution in the existing 3GPP protocol, and the pilot pattern STTD Pattern may be sent according to a corresponding CPICH pattern. For more details, reference may be made to a CPICH pattern shown in section 5.3.3.1 in the 3GPP TS 25.211 V10.0.0 version. A person skilled in the art can learn that, an example about a CPICH pattern in the 3GPP protocol in this embodiment is merely used for explaining an STTD pattern, and a solution in which any pattern based on an STTD modulation mode is used to send a CPICH5 and a CPICH6 or a CPICH3 and a CPICH4 shall fall within the protection scope of the present invention.

A person skilled in the art should understand that, in this embodiment, all terminals may perform, according to pilot signals CPICH1 and CPICH2 that are required for CSI estimation and data demodulation, channel state information CSI estimation and channel estimation that is required for data demodulation; and a first-type terminal may further perform CSI estimation according to pilot signals CPICH3 and CPICH4 that are required for CSI estimation, and perform, according to pilot signals CPICH5 and CPICH6 that are used for data demodulation, channel estimation required for data demodulation. In addition, when the pilot signal transmitting method provided in the present invention and based on whether a first-type terminal is scheduled is used in an 8 Branch MIMO system, steps of implementing a corresponding pilot signal transmitting method are basically the same as those in a 4 Branch MIMO system. In the 8 Branch MIMO system, a base station may determine, according to whether a first-type terminal is scheduled within a TTI, whether to add transmitting of a pilot signal, which is used for data demodulation, on a newly added third to eighth antennas separately within the corresponding TTI.

Embodiment 2

Figure 6:
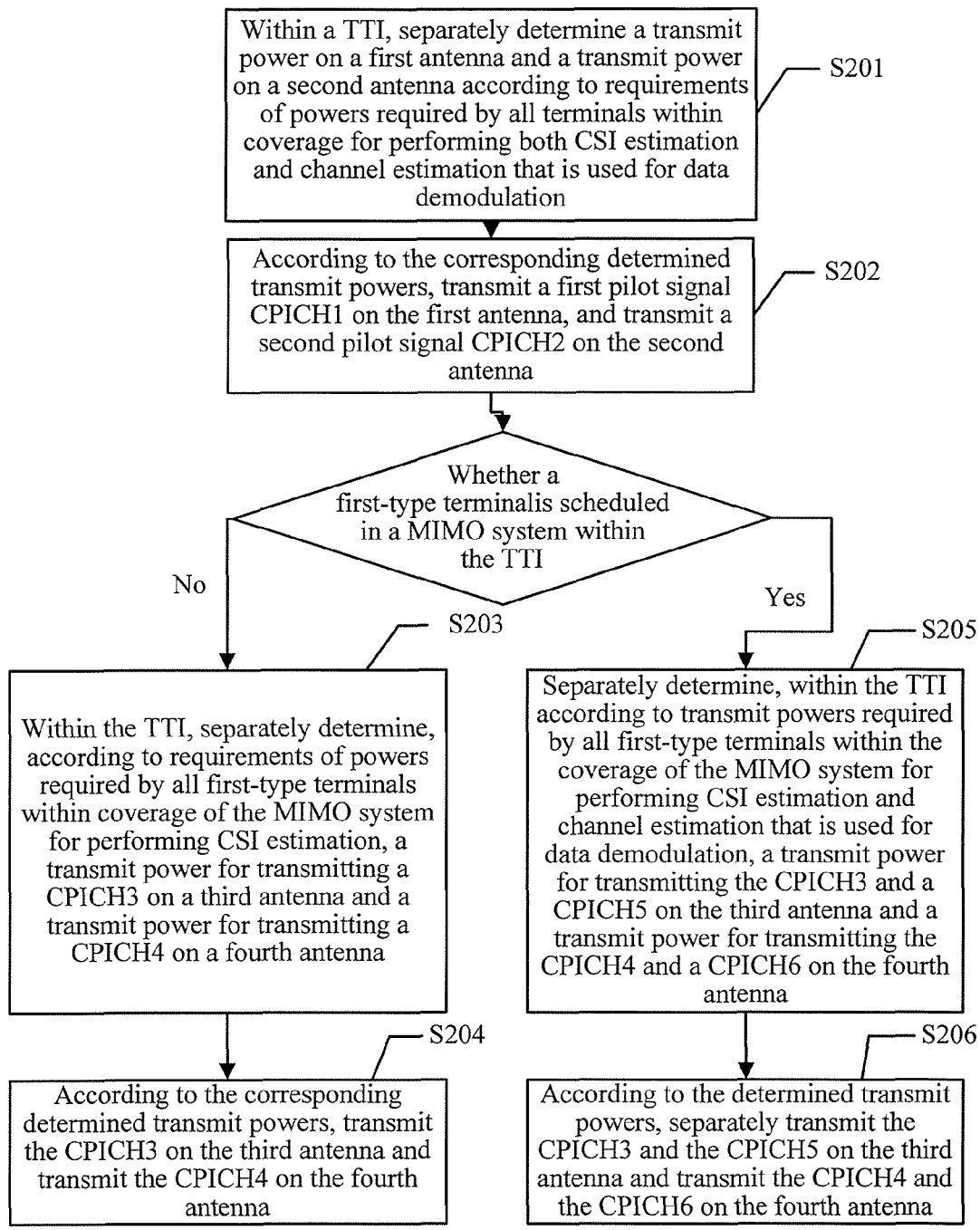
FIG. 6 is a schematic flowchart of a pilot signal transmitting method according to Embodiment 2 of the present invention.

FIG. 6 is a schematic flowchart of Embodiment 2 of a pilot signal transmitting method according to the present invention. The method in this embodiment specifically includes:

S201: Within a TTI, separately determine a transmit power on a first antenna and a transmit power on a second antenna according to requirements of powers required by all terminals within coverage for performing both CSI estimation and channel estimation that is used for data demodulation.

S202: According to the corresponding determined transmit powers, transmit a first pilot signal CPICH1 on the first antenna, and transmit a second pilot signal CPICH2 on the second antenna.

Specifically, step S201 and step S202 in this embodiment correspond to the determining of a transmit power in step S101 in Embodiment 1 of the foregoing method. That is, in step S201, within the TTI, a transmit power $P_{Pilot,1}=P_{SPilot,1}+P_{EPilot,1}$ of the CPICH1 on the first antenna and a transmit power $P_{Pilot,2}=P_{SPilot,2}+P_{EPilot,2}$ of the CPICH2 on the second antenna are determined according to requirements of powers required by all terminals within coverage of a base station for performing both channel state information CSI estimation and channel estimation that is used for data demodulation; and then in step S202, transmitting is performed according to the determined transmit powers.

The transmit power $P_{Pilot,1}$ for transmitting the CPICH1 on the first antenna and the transmit power $P_{Pilot,2}$ for transmitting the CPICH2 on the second antenna, which are determined in step S201, may be the same or may be different. The transmit power $P_{Pilot,1}$ and the transmit power $P_{Pilot,2}$ may be configured according to a specific condition or adjusted according to a working condition of a legacy terminal within the coverage of the base station by the base station. Generally, to conform to an existing downlink 2×2 MIMO transmitting mode, $P_{Pilot,1} > P_{Pilot,2}$ may be set. A person skilled in the prior art should learn that $P_{Pilot,1} > P_{Pilot,2}$ provided herein is merely for reference for compatibility with an existing 2×2 MIMO transmission mode, but is not used to limit value setting of the transmit powers on the first antenna and the second antenna in the present invention.

Further, transmitting time in step S201, that is, transmitting is specifically performed in which TTI, may be arranged as required. Transmitting may be performed within all TTIs, or may be performed in TTIs in a period. In addition, the transmit powers corresponding to the first antenna and the second antenna may also be adjusted according to a use condition of a terminal within the coverage of the base station, and is not necessary limited to required powers enabling all terminals to perform both channel state information CSI estimation and channel estimation that is used for data demodulation.

S203: Within the TTI, separately determine, according to requirements of powers required by all first-type terminals (including a 4 Branch MIMO terminal and/or an 8 Branch MIMO) within coverage of a MIMO system for performing CSI estimation, a transmit power for transmitting a CPICH3 on a third antenna and a transmit power for transmitting a CPICH4 on a fourth antenna.

S204: According to the corresponding determined transmit powers, transmit the CPICH3 on the third antenna and transmit the CPICH4 on the fourth antenna.

Specifically, step S203 and step S204 correspond to the determining of a transmit power in step S102 in the foregoing method embodiment. That is, in step S203, when it is determined that no first-type terminal is scheduled within the TTI, the transmit power for transmitting the CPICH3 on the third antenna and the transmit power for transmitting the CPICH4 on the fourth antenna are determined according to the requirements of powers required by all the first-type terminals (including the 4 Branch MIMO terminal or the 8 Branch MIMO terminal) within the coverage of the base station for performing CSI estimation; and then in step S204, transmitting is performed according to the corresponding powers.

Being the same as the foregoing, transmitting time and the requirements of the powers in step S203 may also be adjusted as required, and are not limited to content disclosed in this embodiment.

S205: Within the TTI, separately determine, according to transmit powers required by all the first-type terminals within the coverage of the MIMO system for performing CSI estimation and channel estimation that is required for data demodulation, a transmit power for transmitting the CPICH3 and a CPICH5 on the third antenna and a transmit power for transmitting the CPICH4 and a CPICH6 on the fourth antenna.

S206: According to the determined transmit powers, separately transmit the CPICH3 and the CPICH5 on the third antenna and transmit the CPICH4 and the CPICH6 on the fourth antenna.

The first-type terminal is a specified reference terminal. If the MIMO system is a 4 Branch MIMO system, the first-type terminal may be a 4 Branch MIMO terminal (including a 4×4 MIMO terminal, a 4×2 MIMO terminal, a 4×1 MIMO terminal, and the like), and if the MIMO system is an 8 Branch MIMO system, the first-type terminal may be an 8 Branch MIMO terminal (including an 8×8 MIMO terminal, an 8×4 MIMO terminal, an 8×2 MIMO terminal, an 8×1 MIMO terminal, and the like), or a 4 Branch MIMO terminal or both.

Specifically, step S205 and step S206 correspond to the determining of a transmit power in step S103 in Embodiment 1 of the foregoing method. That is, in step S205, when it is determined that a first-type terminal is scheduled within the coverage of the MIMO system within a current TTI, the transmit power on the third antenna and the transmit power on the fourth antenna are separately determined according to the requirements of powers required by all the first-type terminals within the coverage of the MIMO system for performing both CSI estimation and channel estimation that is used for data demodulation; and then in step S206, transmitting is performed according to the corresponding powers.

In step S205 and step S206, the determining of a transmit power of a pilot signal on the third antenna is used as an example. When the CPICH3 and the CPICH5 are transmitted separately, their transmit powers are $P_{SPilot,3}$ and $P_{EPilot,3}$ respectively. When the CPICH3 and the CPICH5 are combined into one pilot signal CPICH3' for sending, a transmit power of the CPICH3' is $P_{Pilot,3}+P_{EPilot,3}$. When the CPICH5 is converted into a CPICH5_PatternA, a transmit power of the CPICH5_PatternA is $P_{EPilot,3}$. The determining of a transmit power on the fourth antenna is similar to that on the third antenna, which is not repeatedly described.

Being the same as the foregoing, transmitting time and the requirements of the powers in step S206 may also be adjusted as required, and are not limited to content disclosed in this embodiment.

It should be noted that, in this embodiment of the present invention, during specific implementation, because a terminal performs communication depending on a base station that covers an area in which the terminal is located, the base station may schedule a terminal for transmission as required, and the base station may determine whether a first-type terminal is scheduled within coverage of the base station. When it is determined that no first-type terminal is scheduled, steps S203 and S204 are performed; otherwise, S205 and S206 are performed.

It should be noted that, the pilot signals CPICH1, CPICH2, CPICH3, and CPICH4 that are mentioned in this embodiment are transmitted continuously within all TTIs, where time sequence boundaries of the CPICH1, the CPICH2, the CPICH3, and the CPICH4 are aligned with a time sequence boundary of a P-CCPCH (Primary Common Control Physical Channel, primary common control physical channel) channel; and time sequence boundaries of the CPICH5 and the CPICH6, which are added for transmitting, are aligned with a time sequence boundary of an HS-PDSCH (High Speed Physical Shared Channel, high speed physical shared channel) channel, that is, two timeslots later than the P-CCPCH (that is, the CPICH1, the CPICH2, the CPICH3, and the CPICH4), and the CPICH5 and the CPICH6 are transmitted only in a TTI in which a first-type terminal is scheduled. Specifically, reference may be made to schematic diagrams, which are shown in FIG. 2 to FIG. 5, of a time sequence of a pilot signal transmitted on each antenna in the MIMO system.

It should be further noted that, the time sequence boundaries of the CPICH5 and the CPICH6 that are transmitted in step S206 are aligned with the time sequence boundary of the high speed physical shared channel HS-PDSCH. Alternatively, as another implementation manner, it may further be as follows: the time sequence boundary of the high speed physical shared channel HS-PDSCH is a benchmark for the time sequence boundaries of the CPICH5 and the CPICH6, that is, transmitting starts a plurality of symbolic times ahead of the TTI in which a first-type terminal is scheduled, and the transmitting continues for a plurality of symbolic times after the TTI in which a first-type terminal is scheduled, where lengths of advanced and prolonged symbol times are specified by a system in advance. An advantage of such a practice lies in that a channel estimation effect of a terminal at a boundary within a TTI in which a first-type terminal is scheduled may be optimized.

When the pilot signal transmitting method in this embodiment of the present invention is applied in a MIMO system, interference of a transmit power on an added antenna caused to a legacy terminal may be greatly reduced on a basis of being compatible with the legacy terminal. When no first-type terminal is scheduled, the transmit power on the added antenna is only powers required by all first-type terminals (including a 4 Branch MIMO terminal and/or an 8 Branch MIMO terminal) within coverage of a base station for performing CSI estimation, and the power is relatively small, thereby reducing interference to a legacy terminal. The present invention ensures performance of a legacy terminal while ensuring that a first-type terminal in a MIMO system can work well, and furthermore, can effectively reduce power consumption for pilot signal transmitting.

Embodiment 3

Figure 7:
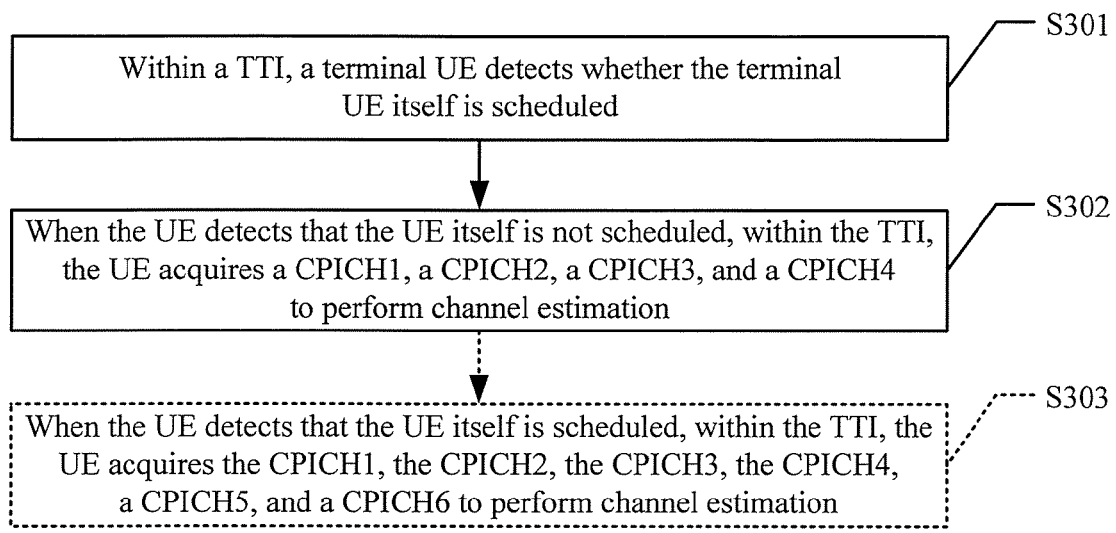
FIG. 7 is a schematic flowchart of a channel estimation method according to Embodiment 3 of the present invention.

Referring to FIG. 7, FIG. 7 is a schematic flowchart of a channel estimation method in a MIMO system according to the present invention. The channel estimation method in this embodiment is used for performing channel estimation to a pilot signal that is delivered by a base station side and received by a first-type terminal in a multiple-input multiple-output MIMO system. The channel estimation method in this embodiment specifically includes:

S301: Within a TTI, a terminal UE detects whether the terminal UE itself is scheduled.

Specifically, the UE may detect, according to detection and demodulation performed on a downlink HS-SCCH channel of a base station, whether the UE itself is scheduled by the base station. It should be noted that, the first-type terminal in the MIMO system in this embodiment is a defined reference terminal. In a 4 Branch MIMO system, the first-type terminal is a 4 Branch MIMO terminal (including a 4×4 MIMO terminal, a 4×2 MIMO terminal, a 4×1 MIMO terminal, and the like); and in an 8 Branch MIMO system, the first-type terminal is an 8 Branch MIMO terminal (including an 8×8 MIMO terminal, an 8×4 MIMO terminal, an 8×2 MIMO terminal, an 8×1 MIMO terminal, and the like) or a 4 Branch MIMO terminal or both. As an executing body of this method embodiment, the UE belongs to the first-type terminal.

S302: When the UE detects that the UE itself is not scheduled, within the TTI, the UE acquires a CPICH1, a CPICH2, a CPICH3, and a CPICH4 to perform channel estimation.

It should be noted that, the UE may perform, according to the pilot signals CPICH1 and CPICH2 that are used for channel sounding and data demodulation, channel state information CSI estimation and channel estimation that is required for data demodulation. The UE may perform CSI estimation according to the pilot signals CPICH3 and CPICH4 that are required for CSI estimation.

S303: When the UE detects that the UE itself is scheduled, within the TTI, the UE acquires the CPICH1, the CPICH2, the CPICH3, the CPICH4, a CPICH5, and a CPICH6 to perform channel estimation.

It should be noted that, the first-type terminal may perform, according to the pilot signals CPICH1 and CPICH2 that are used for channel sounding (CSI estimation) and data demodulation, channel state information CSI estimation and channel estimation that is required for data demodulation, perform CSI estimation according to the pilot signals CPICH3 and CPICH4, and perform, according to the pilot signals CPICH5 and CPICH6, channel estimation that is required for data demodulation; and may also perform, by combining the CPICH3 with the CPICH5, channel estimation that is required for data demodulation, and perform, by combining the CPICH4 with the CPICH6, channel estimation that is required for data demodulation.

In this embodiment, the CPICH1 and the CPICH2 are a first pilot signal and a second pilot signal that are transmitted, on a base station side, respectively on a first antenna and a second antenna and are required for performing CSI estimation and channel estimation that is used for data demodulation; the CPICH3 and the CPICH4 are a third pilot signal and a fourth pilot signal that are transmitted, on the base station side, respectively on a third antenna and a fourth antenna and are required for performing CSI estimation; and the CPICH5 and the CPICH6 are a fifth pilot signal and a sixth pilot signal that are added, on the base station side within a corresponding TTI, for transmitting on the third antenna and the fourth antenna respectively, when it is determined that a first-type terminal is scheduled in the MIMO system within the corresponding TTI, where the fifth pilot signal and the sixth pilot signal are required for performing channel estimation for data demodulation.

Specifically, for the CPICH1 and the CPICH2, the base station first separately determines a transmit power on the first antenna and a transmit power on the second antenna according to requirements of powers required by all terminals within coverage for performing both CSI estimation and channel estimation that is used for data demodulation, and then transmits the CPICH1 on the first antenna and transmits the CPICH2 on the second antenna. For the CPICH3 and the CPICH4, the base station separately determines a transmit power on the third antenna and a transmit power on the fourth antenna according to requirements of powers required by all first-type terminals within the coverage for performing CSI estimation, and respectively transmits the CPICH3 on the third antenna according to the corresponding transmit power and transmits the CPICH4 on the fourth antenna according to the corresponding transmit power. Further, for the CPICH5 and the CPICH6, the base station may choose, according to a scheduling condition of a first-type terminal within each TTI, to transmit or not to transmit the CPICH5 and the CPICH6 within a corresponding TTI. If a first-type terminal is scheduled within a TTI, the base station adds, according to transmit powers, within the TTI, required for ensuring that all the first-type terminals within the coverage of the MIMO system to perform CSI estimation and channel estimation that is used for data demodulation, the pilot signals CPICH5 and CPICH6, which are used for data demodulation, on the third antenna and the fourth antenna respectively for transmitting. If no first-type terminal is scheduled by the base station within the TTI, the base station does not transmit the CPICH5 and the CPICH6 within the TTI, or it may be considered that transmit powers of the CPICH5 and the CPICH6 are zero.

Further, in step S302, when the CPICH3 and the CPICH4 are sent through two code channels, the UE may acquire the CPICH3 and the CPICH4 from the two code channels to perform channel estimation; or when the CPICH3 and the CPICH4 are sent through one code channel according to two orthogonal space-time block coding based transmit diversity pilot patterns STTD patterns, the UE may acquire, from the code channel, received signals that are of the CPICH3 and the CPICH4 and are transmitted according to the two orthogonal space-time block coding based transmit diversity pilot patterns STTD patterns, and perform channel estimation according to orthogonality of the two STTD patterns. Specifically, the UE may acquire, from one code channel, a received signal that is obtained by superposing, in a same code channel, a CPICH3_PatternA and a CPICH3_PatternB that are mutually orthogonal, and obtain a channel estimation value between the third antenna on the base station side and a receive antenna on a terminal side and a channel estimation value between the fourth antenna on the base station side and the receive antenna on the terminal side in an STTD channel estimation manner according to orthogonality of the CPICH3_PatternA and the CPICH3_PatternB, where the CPICH3_PatternA and the CPICH3_PatternB are sent in one code channel according to the orthogonal STTD patterns after superposition.

Further, in step S303, it should be noted that:

when the CPICH3 and the CPICH5 that are transmitted on the third antenna are sent through two different code channels, and the CPICH4 and the CPICH6 that are transmitted on the fourth antenna are combined into one pilot signal CPICH4' and sent through another code channel, the CPICH3 and the CPICH5 may be acquired from the two different code channels, and the CPICH4' that is obtained by combining the CPICH4 and the CPICH6 may be acquired from the another code channel, so as to perform channel estimation; and specifically, on the third antenna, the CPICH3 and the CPICH5 need to be combined to perform CSI estimation and channel estimation that is used for data demodulation (it is known that, on the third antenna, within the TTI, a transmit power of the CPICH3 is $P_{SPilot,3}$ and a transmit power of the CPICH5 is $P_{EPilot,3}$); and on the fourth antenna, the CPICH4 and the CPICH6 need to be combined into the pilot signal CPICH4' to perform channel estimation (it is known that a transmit power on the fourth antenna within the TTI is $P_{SPilot,4}+P_{EPilot,4}$); or when the CPICH3 and the CPICH5 that are transmitted on the third antenna are combined into one pilot signal CPICH3' and sent through one code channel, and the CPICH4 and the CPICH6 that are transmitted on the fourth antenna are combined into another pilot signal CPICH4' and sent through another code channel, the CPICH3' that is obtained by combining the CPICH3 and the CPICH5 may be acquired from one code channel, and the CPICH4' that is obtained by combining the CPICH4 and the CPICH6 may be acquired from the another code channel, so as to perform channel estimation; and specifically, on the third antenna, the CPICH3 and the CPICH5 need to be combined into the pilot signal CPICH3' to perform CSI estimation and channel estimation that is used for data demodulation (it is known that a transmit power on the third antenna within the TTI is $P_{SPilot,3}+P_{EPilot,3}$); and on the fourth antenna, the CPICH4 and the CPICH6 need to be combined into the pilot signal CPICH4' to perform CSI estimation and channel estimation that is used for data demodulation (it is known that a transmit power on the fourth antenna within the TTI is $P_{SPilot,4}+P_{EPilot,4}$); or when the CPICH3 that is transmitted on the third antenna and the CPICH4 that is transmitted on the fourth antenna are sent through two code channels, and the CPICH5 that is transmitted on the third antenna and the CPICH6 that is transmitted on the fourth antenna are sent through another code channel according to two orthogonal space-time block coding based transmit diversity pilot patterns STTD patterns, the CPICH3 and the CPICH4 may be acquired from the two code channels, and received signals that are of the CPICH5 and the CPICH6 and are transmitted according to the orthogonal STTD patterns may be acquired from the another code channel, so as to perform channel estimation; and a specific manner may be as follows: for the CPICH1 and the CPICH2 on the first antenna and the second antenna, channel estimation is performed according to an original solution; for the third antenna and the fourth antenna, the channel estimation value between the third antenna on the base station side and the receive antenna on the terminal side and the channel estimation value between the fourth antenna on the base station side and the receive antenna on the terminal side are acquired in an STTD channel estimation manner according to orthogonality of a CPICH5_PatternA and a CPICH5_PatternB; and CSI estimation and data demodulation may be performed with reference to a channel estimation result obtained by using the CPICH3 and the CPICH4; or when the CPICH3 that is transmitted on the third antenna and the CPICH4 that is transmitted on the fourth antenna are sent through one code channel according to two orthogonal space-time block coding based transmit diversity pilot patterns STTD patterns, and the CPICH5 that is transmitted on the third antenna and the CPICH6 that is transmitted on the fourth antenna are sent through another code channel according to two orthogonal space-time block coding based transmit diversity pilot patterns STTD patterns, received signals that are of the CPICH3 and the CPICH4 and are sent according to the two orthogonal STTD patterns may be acquired from one code channel, and received signals that are of the CPICH5 and the CPICH6 and are sent according to the two orthogonal STTD patterns may be acquired from the another code channel, so as to perform channel estimation in an STTD channel estimation manner separately; and a specific manner is as follows: in terms of CSI estimation, for the CPICH1 and the CPICH2 respectively on the first antenna and the second antenna, channel estimation is performed according to an original solution; and for the third antenna and the fourth antenna, a channel estimation result is obtained in an STTD channel estimation manner according to orthogonality of a CPICH3_PatternA and a CPICH3_PatternB, and then a CSI estimation result is obtained according to the channel estimation result; and in terms of data demodulation, for the CPICH1 and the CPICH2 on the first antenna and the second antenna, channel estimation is performed according to an original solution; and for the third antenna and the fourth antenna, a channel estimation result is obtained in an STTD channel estimation manner according to orthogonality of a CPICH5_PatternA and a CPICH5_PatternB, and data demodulation may further be performed with reference to a channel estimation result obtained by using the CPICH3_PatternA and the CPICH3_PatternB.

In this embodiment, when the first-type terminal detects that the first-type terminal itself is not scheduled, based on step S302, the first-type terminal may obtain a channel estimation result that meets a requirement of CSI estimation, which may be used for channel estimation optimization in a subsequent TTI, such as channel smooth filtering; and when the first-type terminal detects that the first-type terminal itself is scheduled, based on step S303, the first-type terminal may obtain a channel estimation result, which may be used for CSI estimation and data demodulation, and may also be used for channel estimation optimization in a subsequent TTI, such as channel smooth filtering.

In this embodiment of the present invention, a first-type terminal in a MIMO system, that is, a 4 Branch MIMO terminal (including a 4×4 MIMO terminal, a 4×2 MIMO terminal, a 4×1 MIMO terminal, and the like) in a 4 Branch MIMO system, or an 8 Branch MIMO terminal (including an 8×8 MIMO terminal, an 8×4 MIMO terminal, an 8×2 MIMO terminal, an 8×1 MIMO terminal, and the like) or a 4 Branch MIMO terminal or both in an 8 Branch MIMO system, can well perform channel estimation according to a pilot signal sent on each antenna on a base station and perform channel estimation optimization in a subsequent TTI.

It should be noted that, in the channel estimation method in this embodiment, because whether another first-type terminal is scheduled in a corresponding TTI is not detected, a detection overhead on a terminal side is saved. The method in this embodiment applies to a first-type terminal that does not impose a high requirement on channel estimation.

Embodiment 4

Figure 8:
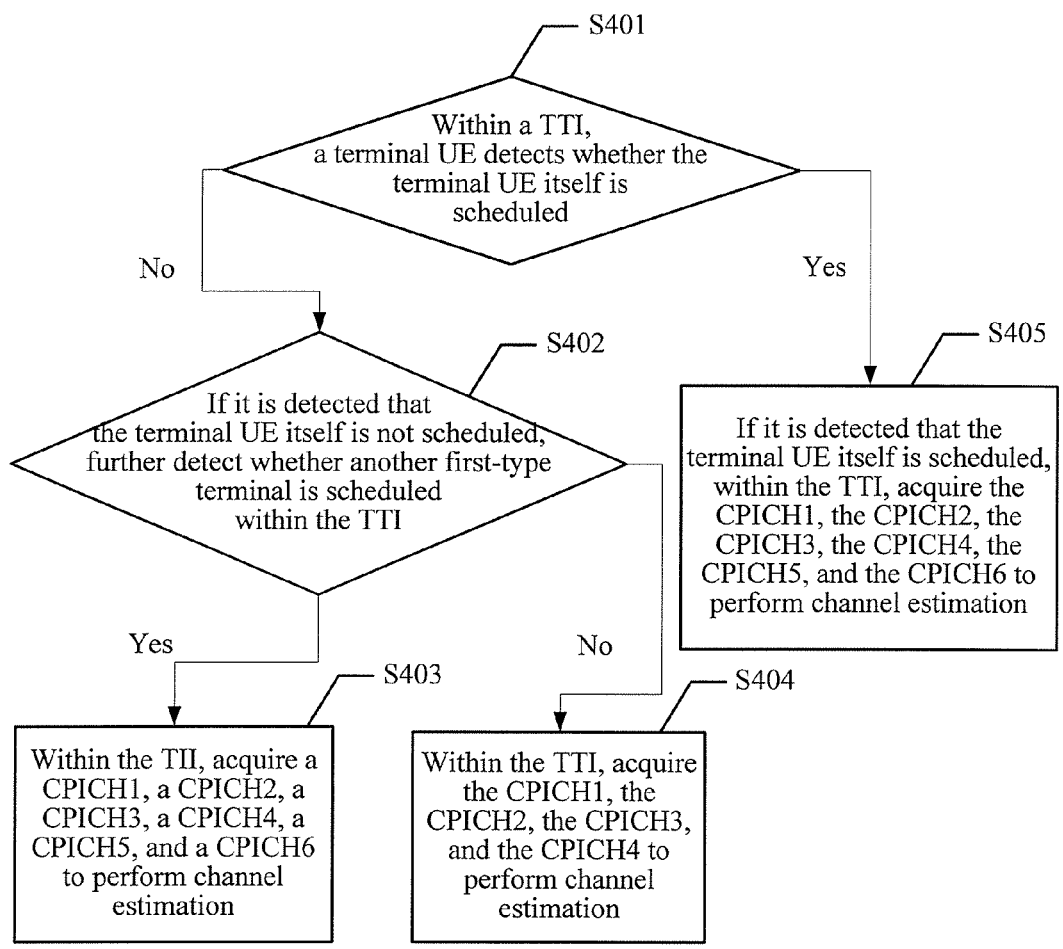
FIG. 8 is a schematic flowchart of a channel estimation method according to Embodiment 4 of the present invention.

Referring to FIG. 8, FIG. 8 is a schematic flowchart of a channel estimation method in another type of MIMO system according to the present invention. The channel estimation method in this embodiment is used for performing channel estimation to a pilot signal that is acquired by a first-type terminal in a multiple-input multiple-output MIMO system. The channel estimation method in this embodiment specifically includes:

S401: Within a TTI, a terminal UE detects whether the terminal UE itself is scheduled.

In step S401, the UE may detect, according to detection and demodulation performed on a downlink HS-SCCH channel of a base station, whether the UE itself is scheduled by the base station. Specifically, determining is performed by detecting whether an HS-SCCH channel uses an identifier of the UE within a corresponding TTI to perform a cyclic redundancy check (Cyclic Redundancy Check, CRC) for adding a mask.

It should be noted that, the first-type terminal in the MIMO system in this embodiment is a defined reference terminal. In a 4 Branch MIMO system, the first-type terminal is a 4 Branch MIMO terminal (including a 4×4 MIMO terminal, a 4×2 MIMO terminal, a 4×1 MIMO terminal, and the like); and in an 8 Branch MIMO system, the first-type terminal is an 8 Branch MIMO terminal (including an 8×8 MIMO terminal, an 8×4 MIMO terminal, an 8×2 MIMO terminal, an 8×1 MIMO terminal, and the like), or a 4 Branch MIMO terminal or both. As an executing body of this method embodiment, the UE belongs to the first-type terminal.

S402: If it is detected that the terminal UE itself is not scheduled, further detect whether another first-type terminal is scheduled within the TTI. If another first-type terminal is scheduled, step S403 is performed; otherwise, step S404 is performed.

S403: Within the TTI, acquire a CPICH1, a CPICH2, a CPICH3, a CPICH4, a CPICH5, and a CPICH6 to perform channel estimation within the current TTI.

S404: Within the TTI, acquire the CPICH1, the CPICH2, the CPICH3, and the CPICH4 to perform channel estimation.

S405: If it is detected that the terminal UE itself is scheduled, within the TTI, acquire the CPICH1, the CPICH2, the CPICH3, the CPICH4, the CPICH5, and the CPICH6 to perform channel estimation.

In this embodiment, the CPICH1 and the CPICH2 are a first pilot signal and a second pilot signal that are transmitted, on a base station side, respectively on a first antenna and a second antenna and are required for performing CSI estimation and channel estimation that is used for data demodulation; the CPICH3 and the CPICH4 are a third pilot signal and a fourth pilot signal that are transmitted, on the base station side, respectively on a third antenna and a fourth antenna and are required for performing CSI estimation; and the CPICH5 and the CPICH6 are a fifth pilot signal and a sixth pilot signal that are added, on the base station side within a corresponding TTI, for transmitting on the third antenna and the fourth antenna respectively, when it is determined that a first-type terminal is scheduled in the MIMO system within the corresponding TTI, where the fifth pilot signal and the sixth pilot signal are required for performing channel estimation for data demodulation.

Specifically, for the CPICH1 and the CPICH2, the base station first separately determines a transmit power on the first antenna and a transmit power on the second antenna according to requirements of powers required by all terminals within coverage for performing both CSI estimation and channel estimation that is used for data demodulation, and then transmits the CPICH1 on the first antenna and transmits the CPICH2 on the second antenna. For the CPICH3 and the CPICH4, the base station separately determines a transmit power on the third antenna and a transmit power on the fourth antenna according to requirements of powers required by all first-type terminals within the coverage for performing CSI estimation, and respectively transmits the CPICH3 on the third antenna according to the corresponding transmit power and transmits the CPICH4 on the fourth antenna according to the corresponding transmit power. Further, for the CPICH5 and the CPICH6, the base station may choose, according to a scheduling condition of a first-type terminal within each TTI, to transmit or not to transmit the CPICH5 and the CPICH6 within a corresponding TTI. If a first-type terminal is scheduled within a TTI, the base station adds, according to transmit powers, within the TTI, required for ensuring that all first-type terminals within the coverage of the MIMO system to perform CSI estimation and channel estimation that is used for data demodulation, the pilot signals CPICH5 and CPICH6, which are used for data demodulation, on the third antenna and the fourth antenna respectively for transmitting. If no first-type terminal is scheduled by the base station within the TTI, the base station does not transmit the CPICH5 and the CPICH6 within the TTI, or it may be considered that transmit powers of the CPICH5 and the CPICH6 are zero.

It should be further noted that, in step 402, if the UE detects that the UE itself is not scheduled within the TTI, the UE further detects whether another first-type terminal (a 4 Branch MIMO UE or an 8 Branch MIMO UE or both) is scheduled within the TTI, which may specifically include:

when the CPICH3 and the CPICH5 that are transmitted on the third antenna are sent through two code channels, and the CPICH4 and the CPICH6 that are transmitted on the fourth antenna are combined into one pilot signal CPICH4' and sent through another code channel, the UE may perform power detection inside a code channel in which the CPICH5 is located, where if it is detected that there exists a transmit power inside the code channel in which the CPICH5 is located, it indicates that another first-type terminal is scheduled within the TTI, and in this case, the pilot signal CPICH4' that is obtained by combining the CPICH4 and the CPICH6 and is on the fourth antenna is definitely sent at a power $P_{SPilot,4}+P_{EPilot,4}$ at which channel sounding (CSI estimation) and data demodulation can be performed, and the UE performs CSI estimation according to a transmit power that is of the CPICH4' and is obtained from a result of the foregoing detection, and herein, the UE may combine the CPICH1, the CPICH2, the CPICH3, and the CPICH4' to perform CSI estimation, or may combine the CPICH1, the CPICH2, the CPICH3, the CPICH5, and the CPICH4' to perform channel estimation to obtain a CSI estimation result; and if it is detected that there exists no transmit power inside the code channel in which the CPICH5 is located, it indicates that no other first-type terminal is scheduled within the TTI, and in this case, the CPICH4' on the fourth antenna is definitely sent at a power $P_{SPilot,4}$ that supports only CSI estimation, and the UE may combine the CPICH1, the CPICH2, the CPICH3, and the CPICH4' to perform CSI estimation; or when the CPICH3 and the CPICH5 that are transmitted on the third antenna are combined into one pilot signal CPICH3' and sent by using one code channel, and the CPICH4 and the CPICH6 that are transmitted on the fourth antenna are combined into another pilot signal CPICH4' and sent by using another code channel, the UE may perform power detection inside the two code channels separately, where if it is detected inside the two code channels that the CPICH3' and the CPICH4' are sent according to a transmit power that not only satisfies CSI estimation but also satisfies data demodulation, another first-type terminal is scheduled within the TTI, and in this case, the CPICH3' and the CPICH4' that are transmitted respectively on the third antenna and the fourth antenna are definitely sent according to transmit powers $P_{SPilot,3}+P_{EPilot,3}$ and $P_{Pilot,4}+P_{EPilot,4}$ at which channel sounding (CSI estimation) and data demodulation can be performed; and if it is detected inside the two code channels that both the CPICH3' and the CPICH4' are sent at a power that supports only CSI estimation, it indicates that no other first-type terminal is scheduled within the TTI, and in this case, the CPICH3' and the CPICH4' that are transmitted respectively on the third antenna and the fourth antenna are definitely sent at powers $P_{SPilot,3}$ and $P_{SPilot,4}$ that support only CSI estimation, that is, only the CPICH3 and the CPICH4 are sent, and transmit powers of the CPICH5 and the CPICH6 are zero, which may be considered as that the CPICH5 and the CPICH6 are not sent, and the UE performs CSI estimation according to actual transmit powers that are of the CPICH3' and CPICH4' and are obtained from a result of the foregoing detection; or when the CPICH3 and the CPICH4 are sent through two code channels, and the CPICH5 and the CPICH6 are sent through another code channel according to two orthogonal space-time block coding based transmit diversity pilot patterns STTD patterns, the UE detects whether power is sent in the another code channel, that is, a code channel in which the two orthogonal STTD patterns: a CPICH5_PatternA and a CPICH5_PatternB are located, where if power is sent, it indicates that another first-type terminal is scheduled within the TTI, and in this case, for the CPICH1 and the CPICH2 on the first antenna and the second antenna, channel estimation is performed according to an original solution, and for the third antenna and the fourth antenna, a channel estimation result is obtained in an STTD channel estimation manner according to orthogonality of the CPICH5_PatternA and the CPICH5_PatternB, and meanwhile, CSI estimation may further be performed with reference to a channel estimation result obtained by using the CPICH3 and the CPICH4; and if it is detected that no power is sent inside the code channel in which the CPICH5_PatternA and the CPICH5_PatternB are located, CSI estimation is performed by using only the CPICH1, the CPICH2, the CPICH3, and the CPICH4; or when the CPICH3 and the CPICH4 are sent through one code channel according to two orthogonal STTD patterns and the CPICH5 and the CPICH6 are sent through another code channel according to two orthogonal STTD patterns, the UE detects whether power is sent inside the another code channel (that is, a channel in which a CPICH5_PatternA and a CPICH5_PatternB are located), where if power is sent, it indicates that another first-type terminal is scheduled within the TTI, and in this case, for the CPICH1 and the CPICH2 on the first antenna and the second antenna, channel estimation is performed according to an original solution, and for the third antenna and the fourth antenna, a channel estimation result is obtained in an STTD channel estimation manner according to orthogonality of the CPICH5_PatternA and the CPICH5_PatternB, and meanwhile, data demodulation may further be performed with reference to a channel estimation result obtained by using orthogonality of a CPICH3_PatternA and a CPICH3_PatternB; and if it is detected that no power is sent inside the code channel in which the CPICH5_PatternA and the CPICH5_PatternB are located, it indicates that no other first-type terminal is scheduled within the TTI, and the UE performs CSI estimation according to the CPICH1, the CPICH2, the CPICH3_PatternA and the CPICH3_PatternB within the TTI.

In this embodiment, when the first-type terminal detects that the first-type terminal itself is not scheduled or detects that no other first-type terminal is scheduled, based on step S404, the first-type terminal may obtain a channel estimation result that meets a requirement of CSI estimation, which may be used for channel estimation optimization in a subsequent TTI, such as channel smooth filtering; and based on step S403 and step S405, the first-type terminal may obtain a channel estimation result, where the channel estimation result meets a requirement of performing both CSI estimation and data demodulation, and may also be used for channel estimation optimization in a subsequent TTI, such as channel smooth filtering.

It should be noted that, for the channel estimation method in this embodiment, reference may be made to the description in Embodiment 3.

In this embodiment of the present invention, a first-type terminal in a MIMO system can well perform signal estimation according to a pilot signal sent on each antenna on a base station and perform channel estimation optimization in a subsequent TTI no matter whether the first-type terminal is scheduled or not scheduled. It should be further noted that, a difference between the two channel estimation methods in a MIMO system in Embodiment 4 and Embodiment 3 in the foregoing lies in that: in the channel estimation method in Embodiment 3, whether another first-type terminal is scheduled within a corresponding TTI does not need to be detected, which saves a detection overhead on a terminal side. However, comparing with the method in Embodiment 4, a channel estimation result of this method is poorer. Therefore, the method in Embodiment 3 applies to a first-type terminal that does not impose a high requirement on channel estimation. In the channel estimation method in Embodiment 4, it is required that whether another first-type terminal is scheduled is detected within each TTI, which increases a detection overhead on a terminal side. However, comparing with the method in Embodiment 3, a channel estimation result of this method is better. Therefore, the method in Embodiment 4 applies to a first-type terminal that imposes a relatively high requirement on channel estimation. Therefore, during specific deployment, a different channel estimation method may be selected according to a different requirement on a detection overhead or channel estimation quality.

A system and an apparatus in the present invention that correspond to the methods in Embodiment 1 to Embodiment 4 in the foregoing are described in detail in the following.

Figure 9:
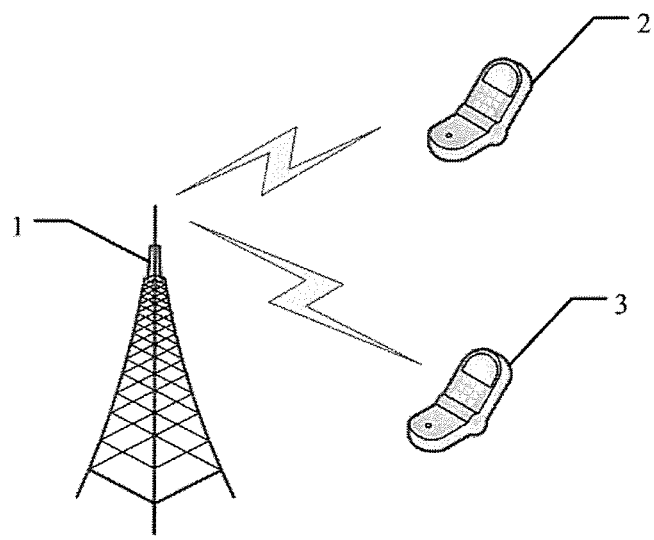
FIG. 9 is a schematic diagram of structural composition of a MIMO system according to the present invention.

Referring to FIG. 9, structural composition of a multiple-input multiple-output system according to an embodiment of the present invention is first introduced. FIG. 9 is a schematic diagram of structural composition of a multiple-input multiple-output system. The system in this embodiment may include but is not limited to a 4 Branch MIMO system, an 8 Branch MIMO system, and the like. The system specifically includes: a base station 1 and multiple terminals within coverage of the base station 1. A pilot signal transmitting apparatus in the base station 1 separately controls, according to a corresponding policy, a corresponding antenna on the base station to transmit a pilot signal, so that all terminals including a first terminal 2 and a second terminal 3 can well perform channel estimation. In a 4 Branch MIMO system, the base station 1 may include four antennas, while in an 8 Branch MIMO system, the base station 1 may include eight antennas.

Next, in Embodiment 5, a description is made by using the base station 1 as an example, and in Embodiment 6, a description is made by using the first terminal 2 and the second terminal 3 among the multiple terminals.

Embodiment 5

Figure 10:
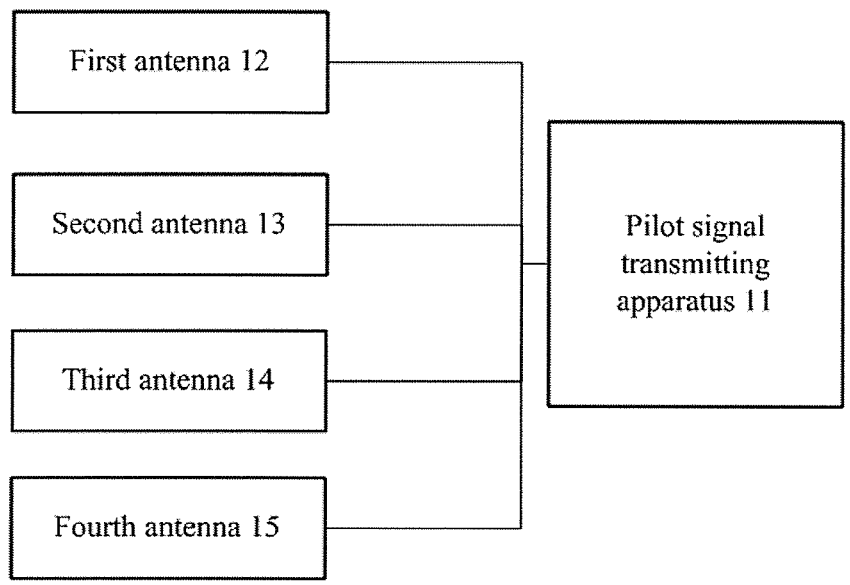
FIG. 10 is a schematic structural diagram of a base station according to Embodiment 5 of the present invention.
Figure 11:
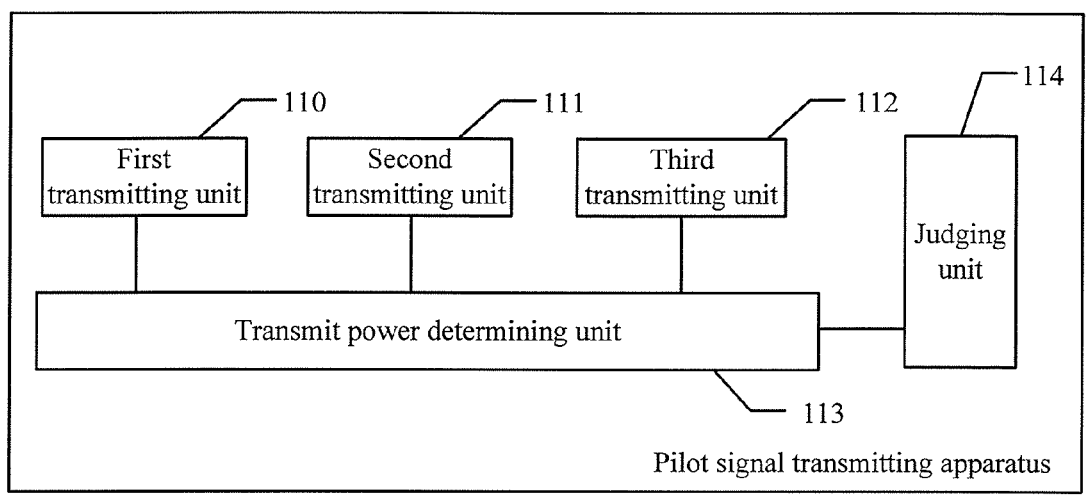
FIG. 11 is a schematic structural diagram of a pilot signal transmitting apparatus according to Embodiment 5 of the present invention.

Specifically, referring to FIG. 10 and FIG. 11, FIG. 10 is a schematic structural diagram of a base station 1 according to an embodiment of the present invention, and FIG. 11 is a schematic structural diagram of a pilot signal transmitting apparatus 11 in the base station 1.

This embodiment of the present invention provides a communications base station 1, where the base station 1 includes: a first antenna 12, a second antenna 13, a third antenna 14, a fourth antenna 15, and a pilot signal transmitting apparatus 11.

The pilot signal transmitting apparatus 11 includes:

a first transmitting unit 110, configured to: within a transmission time interval TTI, transmit a first pilot signal CPICH1 on the first antenna 12, and transmit a second pilot signal CPICH2 on the second antenna 13; and a second transmitting unit 111, configured to: when no first-type terminal is scheduled within coverage of a MIMO system within the TTI, transmit a third pilot signal CPICH3 on the third antenna 14, and transmit a fourth pilot signal CPICH4 on the fourth antenna 15;

where the CPICH1 is used for channel state information CSI estimation and data demodulation, the CPICH2 is used for CSI estimation and data demodulation, the CPICH3 is used for CSI estimation, and the CPICH4 is used for CSI estimation.

According to the base station 1 in this embodiment, when pilot signals are transmitted on the third antenna 14 and the fourth antenna 15, because the CPICH3 and the CPICH4 are transmitted at relatively low powers $P_{SPilot,3}$ and $P_{SPilot,4}$ interference caused to a legacy terminal Legacy UE is reduced, and impact on performance of the Legacy UE caused by an antenna newly added for transmitting a pilot signal is further reduced.

Further, the pilot signal transmission apparatus 11 in this embodiment further includes:

a third transmitting unit 112, configured to: when a first-type terminal is scheduled within the coverage of the MIMO system within the TTI, transmit the CPICH3 and a fifth pilot signal CPICH5 on the third antenna 14, and transmit the CPICH4 and a sixth pilot signal CPICH6 on the fourth antenna 15, where the CPICH3 is used for CSI estimation, the CPICH4 is used for CSI estimation, the CPICH5 is used for data demodulation, and the CPICH6 is used for data demodulation.

The pilot signal transmitting apparatus 11 in this embodiment further includes:

a transmit power determining unit 113, configured to separately determine a transmit power of the first transmitting unit 110 on the first antenna 12 and a transmit power of the first transmitting unit 110 on the second antenna 13 according to requirements of powers required by all terminals within the coverage for performing both CSI estimation and channel estimation that is used for data demodulation; and further configured to separately determine a transmit power of the second transmitting unit 111 on the third antenna 14 and a transmit power of the second transmitting unit 111 on the fourth antenna 15 according to requirements of powers required by all first-type terminals within the coverage for performing CSI estimation; or separately determine, according to requirements of powers required by all first-type terminals within the coverage for performing both CSI estimation and channel estimation that is used for data demodulation, a transmit power for the third transmitting unit 112 to transmit the CPICH3 and the CPICH5 on the third antenna 14 and a transmit power for the third transmitting unit 112 to transmit the CPICH4 and the CPICH6 on the fourth antenna 15.

Further, in this embodiment:

the first transmitting unit 110 is specifically configured to send the CPICH1 and the CPICH2 through two code channels, where specifically, the CPICH1 may be sent through a first code channel and the CPICH2 may be sent through a second code channel; and the second transmitting unit 111 is specifically configured to: when no first-type terminal is scheduled within the coverage of the MIMO system within the TTI, send the CPICH3 and the CPICH4 through two different code channels, where specifically, the CPICH3 may be sent through a third code channel and the CPICH4 may be sent through a fourth code channel; or the CPICH3 and the CPICH4 are sent through one code channel according to two orthogonal space-time block coding based transmit diversity pilot patterns STTD patterns, where specifically, the CPICH3 and the CPICH4 may be sent through a third code channel.

Further, in this embodiment:

the third transmitting unit 112 is specifically configured to: when a first-type terminal is scheduled within the coverage of the MIMO system within the TTI, send, by using two different code channels, the CPICH3 and the CPICH5 that are transmitted on the third antenna 14, and send, by using another code channel, a pilot signal CPICH4' that is obtained by combining the CPICH4 and the CPICH6 that are transmitted on the fourth antenna 15, where specifically, the CPICH3 may be sent through a third code channel, the CPICH5 may be sent through a fourth code channel, and the pilot signal CPICH4' that is obtained by combining the CPICH4 and the CPICH6 may be sent through a fifth code channel; or send, by using one code channel, a pilot signal CPICH3' that is obtained by combining the CPICH3 and the CPICH5 that are transmitted on the third antenna 14 and send, by using another code channel, another pilot signal CPICH4' that is obtained by combining the CPICH4 and the CPICH6 that are transmitted on the fourth antenna 15, where specifically, the CPICH3' that is obtained by combining the CPICH3 and the CPICH5 may be sent through a third code channel, and the CPICH4' that is obtained by combining the CPICH4 and the CPICH6 may be sent through a fourth code channel; or send, by using two different code channels, the CPICH3 that is transmitted on the third antenna 14 and the CPICH4 that is transmitted on the fourth antenna 15, and send, according to two orthogonal space-time block coding based transmit diversity pilot patterns STTD patterns through another code channel, the CPICH5 that is transmitted on the third antenna 14 and the CPICH6 that is transmitted on the fourth antenna 15, where specifically, the CPICH3 may be sent through a third code channel, the CPICH4 may be sent through a fourth code channel, and the CPICH5 and the CPICH6 may be sent through a fifth code channel according to two orthogonal STTD patterns; or send, according to two orthogonal STTD patterns through one code channel, the CPICH3 that is transmitted on the third antenna 14 and the CPICH4 that is transmitted on the fourth antenna 15, and send, according to two orthogonal STTD patterns through another code channel, the CPICH5 that is transmitted on the third antenna 14 and the CPICH6 that is transmitted on the fourth antenna 15, where specifically, the CPICH3 and the CPICH4 may be sent through a third code channel according to two orthogonal STTD patterns, where the CPICH3 is converted into a CPICH3_PatternA and the CPICH4 is converted into a CPICH3_PatternB; and the CPICH5 and the CPICH6 may be sent through a fourth code channel according to two orthogonal STTD patterns, where the CPICH5 is converted into a CPICH5_PatternA and the CPICH6 is converted into a CPICH5_PatternB.

In this embodiment, further, the pilot signal transmitting apparatus 11 further includes:

a judging unit 114, configured to determine whether a first-type terminal is scheduled in the MIMO system within a current TTI, and control, according to a result of the determining, the second transmitting unit 111 or the third transmitting unit 112 to transmit a pilot signal; and specifically, when no first-type terminal is scheduled, control the second transmitting unit 111 to transmit a pilot signal; otherwise, control the third transmitting unit 112 to transmit a pilot signal.

The first terminal 2 and the second terminal 3 in the system are described in detail in the following.

Embodiment 6

In this embodiment, a first terminal 2 and a second terminal 3 both belong to a first-type terminal in a MIMO system. In addition, the first terminal 2 does not impose a high requirement on channel estimation, and the second terminal 3 imposes a high requirement on channel estimation.

Figure 12:
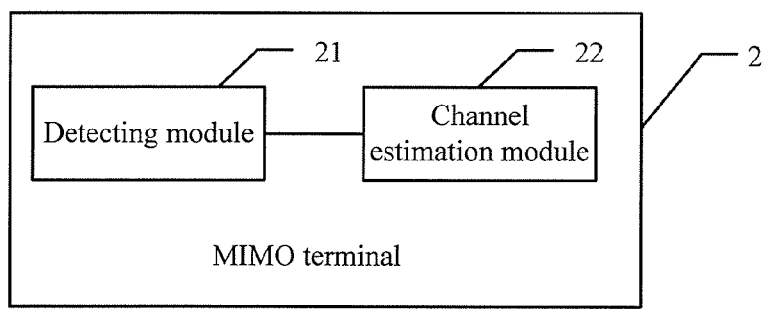
FIG. 12 is a schematic structural diagram of a terminal according to Embodiment 6 of the present invention.

Specifically, as shown in FIG. 12, the first terminal 2 specifically includes:

a detecting module 21, configured to detect whether the first terminal 2 itself is scheduled within a TTI; and a channel estimation module 22, configured to: when it is detected that the first terminal 2 itself is not scheduled, within the TTI, acquire a CPICH1, a CPICH2, a CPICH3, and a CPICH4 to perform channel estimation;

where the CPICH1 and the CPICH2 are a first pilot signal and a second pilot signal that are transmitted, on a base station side, respectively on a first antenna and a second antenna and are required for performing CSI estimation and channel estimation that is used for data demodulation, the CPICH3 and the CPICH4 are a third pilot signal and a fourth pilot signal that are transmitted, on the base station side, respectively on a third antenna and a fourth antenna and are required for performing CSI estimation, and the first terminal 2 is a 4 Branch MIMO terminal corresponding to a 4 Branch MIMO system, or a 4 Branch MIMO terminal or an 8 Branch MIMO terminal or both that correspond to an 8 Branch MIMO system.

Further, in this embodiment, the channel estimation module 22 is further configured to: when it is detected that the first terminal 2 itself is scheduled, within the TTI, acquire the CPICH1, the CPICH2, the CPICH3, the CPICH4, a CPICH5, and a CPICH6 to perform channel estimation;

where the CPICH5 and the CPICH6 are a fifth pilot signal and a sixth pilot signal that are transmitted on the third antenna and the fourth antenna and are required for performing channel estimation for data demodulation.

Figure 13:
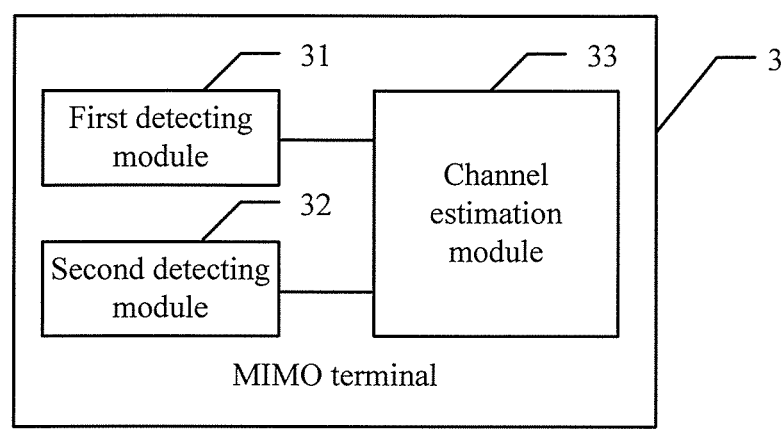
FIG. 13 is a schematic structural diagram of another terminal according to Embodiment 6 of the present invention.

Specifically, as shown in FIG. 13, the second terminal 3 specifically includes:

a first detecting module 31, configured to detect whether the second terminal 3 itself is scheduled within a TTI; and a second detecting module 32, configured to: when the first detecting module 31 detects that the second terminal 3 itself is not scheduled, further detect whether another first-type terminal is scheduled within the TTI; and a channel estimation module 33, configured to: when the second detecting module 32 detects that another first-type terminal is scheduled within the TTI, within the TTI, acquire a CPICH1, a CPICH2, a CPICH3, a CPICH4, a CPICH5, and a CPICH6 to perform channel estimation; or configured to: when the second detecting module 32 detects that no other first-type terminal is scheduled within the TTI, within the TTI, acquire a CPICH1, a CPICH2, a CPICH3, and a CPICH4 to perform channel estimation;

where the CPICH1 and the CPICH2 are a first pilot signal and a second pilot signal that are transmitted, on a base station side, respectively on a first antenna and a second antenna and are required for performing CSI estimation and channel estimation that is used for data demodulation; the CPICH3 and the CPICH4 are a third pilot signal and a fourth pilot signal that are transmitted, on the base station side, respectively on a third antenna and a fourth antenna and are required for performing CSI estimation; the CPICH5 and the CPICH6 are a fifth pilot signal and a sixth pilot signal that are transmitted on the third antenna and the fourth antenna and are required for performing channel estimation for data demodulation; and the second terminal 3 is a 4 Branch MIMO terminal corresponding to a 4 Branch MIMO system, or a 4 Branch MIMO terminal or an 8 Branch MIMO terminal or both that correspond to an 8 Branch MIMO system.

It should be noted that, when the second detecting module 32 detects whether another first-type terminal is scheduled, determining may be performed by detecting whether a code channel in which the CPICH5 or the CPICH6 or both are located has a corresponding transmit power, or performed by using a value of a transmit power. For details, reference may be made to the description part of step S402 in Embodiment 4, which is not repeatedly described herein.

Further, in this embodiment, the channel estimation module 33 is further configured to: when the first detecting module 31 detects that the second terminal 3 itself is scheduled within the TTI, within the TTI, acquire the CPICH1, the CPICH2, the CPICH3, the CPICH4, the CPICH5, and the CPICH6 to perform channel estimation.

According to the embodiments of the present invention, a pilot signal transmitted on an antenna other than a first antenna and a second antenna is determined according to a scheduling situation of a first-type terminal in a MIMO system. This implements that in the MIMO system, interference to legacy terminals may be greatly reduced on a basis of being compatible with the legacy terminals such as a single-input single-output terminal, a single-input two-output terminal, a 2×1 MIMO terminal, and a 2×2 MIMO terminal. Especially, when a first-type terminal, such as a 4 Branch MIMO terminal in a 4 Branch MIMO system or an 8 Branch MIMO terminal in an 8 Branch MIMO system, is not scheduled, interference to a legacy terminal is reduced, and while it is ensured that the first-type terminal can work well in the MIMO system, performance of the legacy terminal is also ensured, and furthermore, power consumption for pilot signal transmitting may also be effectively reduced.

A person of ordinary skill in the art may understand that all or a part of the steps of the methods in the foregoing embodiments may be implemented by a computer program instructing relevant hardware. The program may be stored in a computer readable storage medium. When the program is executed, the steps of the methods in the foregoing embodiments may be performed. The storage medium may be a magnetic disk, an optical disc, a read-only memory (Read-Only Memory, ROM) a random access memory (Random Access Memory, RAM), or the like.

The disclosed above are merely exemplary embodiments of the present invention, but certainly are not intended to limit the rights scope of the present invention. Equivalent variations made according to the claims of the present invention shall fall within the scope covered by the present invention.

What is claimed is:

1. A pilot signal transmitting method for transmitting a pilot signal in a multiple-input multiple-output (MIMO) system, the method comprises:
   within a transmission time interval (TTI), transmitting a first pilot signal (CPICH1) on a first antenna, and transmitting at least a portion of a second pilot signal (CPICH2) on a second antenna; and
   when no first-type terminal is scheduled within coverage of the MIMO system within the TTI, transmitting a third pilot signal (CPICH3) on a third antenna, and transmitting a fourth pilot signal (CPICH4) on a fourth antenna;
   when no legacy terminal is scheduled within coverage of the MIMO system within the TTI, decomposing the CPICH2 into a CPICH2s and a CPICH2e and, when no first-type terminal is scheduled within coverage of the MIMO system within the TTI, transmitting the CPICH2s but not the CPICH2e on the second antenna;
   wherein the CPICH1 is used for channel state information (CSI) estimation and data demodulation, the CPICH2 is used for CSI estimation and data demodulation, CPICH2s is a pilot signal required for performing CSI estimation, the CPICH2e is a pilot signal required for performing data demodulation, the CPICH3 is a pilot signal required for performing CSI estimation, and the CPICH4 is a pilot signal required for performing CSI estimation, the MIMO system comprises a 4 Branch MIMO system or an 8 Branch MIMO system, the first-type terminal is a 4 Branch MIMO terminal corresponding to the 4 Branch MIMO system, or a 4 Branch MIMO terminal or an 8 Branch MIMO terminal corresponding to the 8 Branch MIMO system, and wherein the legacy terminal is one of a single-input single-output terminal, a single-input 2-output terminal, or a 2 Branch MIMO terminal.

2. The method according to claim 1, further comprising: when a first-type terminal is scheduled within the coverage of the MIMO system within the TTI, transmitting the CPICH2e on the second antenna, transmitting the CPICH3 and a fifth pilot signal (CPICH5) on the third antenna, and transmitting the CPICH4 and a sixth pilot signal (CPICH6) on the fourth antenna, wherein the CPICH5 is a pilot signal required for performing data demodulation, and the CPICH6 is a pilot signal required for performing data demodulation.

3. The method according to claim 1, wherein transmitting a third pilot signal (CPICH3) on a third antenna, and transmitting a fourth pilot signal (CPICH4) on a fourth antenna, comprises:
   sending the CPICH3 and the CPICH4 through two code channels; or
   sending the CPICH3 and the CPICH4 through one code channel according to two orthogonal space-time block coding based transmit diversity (STTD) pilot patterns.

4. The method according to claim 2, wherein transmitting the CPICH3 and a fifth pilot signal (CPICH5) on the third antenna, and transmitting the CPICH4 and a sixth pilot signal CPICH6 on the fourth antenna, comprises any of:
   sending the CPICH3 and the CPICH5 through two code channels, and combining the CPICH4 and the CPICH6 into one pilot signal (CPICH4') and sending the CPICH4' through another code channel;
   combining the CPICH3 and the CPICH5 into one pilot signal (CPICH3') and sending the CPICH3' through one code channel, and combining the CPICH4 and the CPICH6 into another pilot signal (CPICH4') and sending the CPICH4' through another code channel;
   sending the CPICH3 and the CPICH4 through two code channels, and sending the CPICH5 and the CPICH6 through another code channel according to two orthogonal space-time block coding based transmit diversity pilot (STTD) patterns; and
   sending the CPICH3 and the CPICH4 through one code channel according to two orthogonal STTD patterns, and sending the CPICH5 and the CPICH6 through another code channel according to two orthogonal space-time block coding based transmit diversity (STTD) patterns.

5. The method according to claim 2, further comprising:
   separately determining, according to transmit powers required by all first-type terminals within the coverage of the MIMO system for performing CSI estimation and channel estimation that is used for data demodulation, a transmit power for transmitting the CPICH3 and the CPICH5 on the third antenna and a transmit power for transmitting the CPICH4 and the CPICH6 on the fourth antenna.

6. The method according to claim 1, wherein:
   time sequence boundaries of the CPICH1, the CPICH2, the CPICH3, and the CPICH4 are aligned with a time sequence boundary of a primary common control physical channel (P-CCPCH); and
   time sequence boundaries of the CPICH5 and the CPICH6 are aligned with a time sequence boundary of a high speed physical downlink shared channel (HS-PDSCH) that is two timeslots later than the CPICH1, the CPICH2, the CPICH3, and the CPICH4.

7. A communications base station, comprising: a first antenna, a second antenna, a third antenna, a fourth antenna, and a pilot signal transmitting apparatus, wherein the pilot signal transmitting apparatus comprises:
- a first transmitting unit, configured to:
  - within a transmission time interval (TTI), transmit a first pilot signal (CPICH1) on the first antenna, and transmit at least a portion of a second pilot signal (CPICH2) on the second antenna;
  - when no legacy terminal is scheduled within coverage of the MIMO system within the TTI, decompose the CPICH2 into a CPICH2s and a CPICH2e and, when no first-type terminal is scheduled within coverage of the MIMO system within the TTI, transmit the CPICH2s but not the CPICH2e on the second antenna; and
- a second transmitting unit, configured to:
  - when no first-type terminal is scheduled within coverage of a MIMO system within the TTI, transmit a third pilot signal (CPICH3) on the third antenna, and transmit a fourth pilot signal (CPICH4) on the fourth antenna;
- wherein the CPICH1 is used for channel state information (CSI) estimation and data demodulation, the CPICH2 is used for CSI estimation and data demodulation, the CPICH2s is used for CSI estimation, the CPICH2e is used for data demodulation, the CPICH3 is used for CSI estimation, and the CPICH4 is used for CSI estimation, and wherein the legacy terminal is one of a single-input single-output terminal, a single-input 2-output terminal, or a 2 Branch MIMO terminal.

8. The base station according to claim 7, wherein the pilot signal transmitting apparatus further comprises:
- a third transmitting unit, configured to: when a first-type terminal is scheduled within the coverage of the MIMO system within the TTI, transmit the CPICH3 and a fifth pilot signal (CPICH5) on the third antenna, and transmit the CPICH4 and a sixth pilot signal (CPICH6) on the fourth antenna;
- wherein the first transmitting unit is configured to transmit the CPICH2e on the second antenna when a first-type terminal is scheduled within the coverage of the MIMO system within the TTI;
- wherein the CPICH3 is used for CSI estimation, the CPICH4 is used for CSI estimation, the CPICH5 is used for data demodulation, and the CPICH6 is used for data demodulation.

9. The base station according to claim 8, wherein the pilot signal transmitting apparatus further comprises:
- a transmit power determining unit, configured to:
  - separately determine a transmit power of the first transmitting unit on the first antenna and a transmit power of the first transmitting unit on the second antenna according to requirements of powers required by all terminals within the coverage for performing both CSI estimation and channel estimation that is used for data demodulation; and
  - separately determine a transmit power of the second transmitting unit on the third antenna and a transmit power of the second transmitting unit on the fourth antenna according to requirements of powers required by all first-type terminals within the coverage for performing CSI estimation; or separately determine, according to requirements of powers required by all first-type terminals within the coverage for performing both CSI estimation and channel estimation that is used for data demodulation, a transmit power for the third transmitting unit to transmit the CPICH3 and the CPICH5 on the third antenna and a transmit power for the third transmitting unit to transmit the CPICH4 and the CPICH6 on the fourth antenna.

10. The base station according to claim 7, wherein:
- the first transmitting unit is configured to send the CPICH1 through a first code channel and send the CPICH2 through a second code channel; and
- the second transmitting unit is configured to send the CPICH3 through a third code channel and send the CPICH4 through a fourth code channel; or configured to send the CPICH3 and the CPICH4 through a third code channel according to two orthogonal space-time block coding based transmit diversity pilot patterns (STTD) patterns.

11. The base station according to claim 8, wherein the third transmitting unit is configured to send any of:
- the CPICH3 through a third code channel, send the CPICH5 through a fourth code channel, and send, through a fifth code channel, a pilot signal (CPICH4') that is obtained by combining the CPICH4 and the CPICH6;
- through a third code channel, a pilot signal (CPICH3') that is obtained by combining the CPICH3 and the CPICH5 and send, through a fourth code channel, another pilot signal (CPICH4') that is obtained by combining the CPICH4 and the CPICH6;
- the CPICH3 through a third code channel, send the CPICH4 through a fourth code channel, and send the CPICH5 and the CPICH6 through a fifth code channel according to two orthogonal space-time block coding based transmit diversity pilot patterns (STTD) patterns; and
- the CPICH3 and the CPICH4 through a third code channel according to two orthogonal STTD patterns and send the CPICH5 and the CPICH6 through a fourth code channel according to two orthogonal STTD patterns.

12. The base station according to claim 8, wherein the pilot signal transmitting apparatus further comprises:
- a judging unit, configured to:
  - determine whether a first-type terminal is scheduled in the MIMO system within the TTI, and control, according to a result of the determining, the second transmitting unit or the third transmitting unit to transmit a pilot signal;
  - if no first-type terminal is scheduled in the MIMO system within the TTI, control the second transmitting unit to transmit a pilot signal; and
  - if a first-type terminal is scheduled in the MIMO system within the TTI, control the third transmitting unit to transmit a pilot signal.

* * * * *